(12) United States Patent  
Rochelle et al.

(10) Patent No.: US 7,938,887 B2  
(45) Date of Patent: May 10, 2011

(54) ACIDIC GAS CAPTURE BY DIAMINES

(75) Inventors: Gary Rochelle, Austin, TX (US); Marcus Hilliard, Missouri City, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 116 days.

(21) Appl. No.: 12/349,627

(22) Filed: Jan. 7, 2009

(65) Prior Publication Data

US 2009/0211446 A1    Aug. 27, 2009

Related U.S. Application Data

(60) Provisional application No. 61/019,646, filed on Jan. 8, 2008.

(51) Int. Cl.
    *B01D 53/14* (2006.01)
(52) U.S. Cl. .............. 95/159; 95/169; 95/236; 423/228; 252/60
(58) Field of Classification Search ............. 95/169, 95/159, 236; 423/228; 252/60
    See application file for complete search history.

(56) References Cited

U.S. PATENT DOCUMENTS

| | | | |
|---|---|---|---|
| 4,064,151 A | 12/1977 | Hedaya et al. | |
| 4,217,237 A * | 8/1980 | Sartori et al. | 252/192 |
| 4,217,238 A | 8/1980 | Sartori et al. | |
| 5,492,683 A | 2/1996 | Birbara et al. | |
| 5,622,681 A | 4/1997 | Grierson et al. | |
| 6,436,174 B1 | 8/2002 | Grossmann et al. | |
| 2007/0028774 A1 | 2/2007 | Rochelle | |
| 2007/0044658 A1 | 3/2007 | Rochelle et al. | |
| 2008/0127831 A1 | 6/2008 | Rochelle et al. | |

FOREIGN PATENT DOCUMENTS

WO    WO2007045679    4/2007

OTHER PUBLICATIONS

"CO2 Capture by Absorption with Potassium Carbonate, First Quarterly Report 2007", DOE Progress Report 41440R20 for Cooperative Agreement DE-FC26-02NT41440, Apr. 27, 2007.
Oynekan, Rochelle, "Alternative Stripper Configurations for CO2 Capture by Aqueous Amines", AIChE Journal, Accepted, 2007.
Yasuyuki Yagi, et al., "Development and Improvement of CO2-Capture System", Presented at the 8th GHGT Conference, 2006.
International Search Report to PCT/US09/45075 dated Aug. 14, 2009.

* cited by examiner

*Primary Examiner* — Duane Smith
*Assistant Examiner* — Tiffany N Palmer
(74) *Attorney, Agent, or Firm* — Baker Botts L.L.P.

(57) ABSTRACT

Compositions and methods related to the removal of acidic gas. In particular, the present disclosure relates to a composition and method for the removal of acidic gas from a gas mixture using a solvent comprising a diamine (e.g., piperazine) and carbon dioxide. One example of a method may involve a method for removing acidic gas comprising contacting a gas mixture having an acidic gas with a solvent, wherein the solvent comprises piperazine in an amount of from about 4 to about 20 moles/kg of water, and carbon dioxide in an amount of from about 0.3 to about 0.9 moles per mole of piperazine.

27 Claims, 34 Drawing Sheets

Figure 21

VLE expression for PZ/$K_2CO_3$, MEA, and promoted MEA $$\ln P_{CO_2}^* = a + b\gamma + \frac{c}{T} + d\frac{\gamma^2}{T} + e\frac{\gamma}{T^2} + f\frac{\gamma}{T}$$

|  | 6.4 m K+/ 1.6 m PZ | 5 m K+/ 2.5 m PZ | 4 m K+/ 4 m PZ | 7 m MEA | MEA/PZ (11.4 m MEA) |
|---|---|---|---|---|---|
| A | -19.49 | -4.59 | 12.088 | 35.11 | 30.27 |
| B | 24.46 | 34.21 | 42.39 | -45.04 | -38.87 |
| C | 3435.22 | -3834.67 | -7087.74 | -14281 | -11991 |
| D | 1464774 | -1747284 | -925155 | -546277 | 1110073 |
| E | -5514009 | -1712091 | 1393782 | -3400441 | -4806203 |
| F | 12068.45 | 8186.474 | -8552.74 | 32670.01 | 31355.6 |
| R square | 0.995 | 0.992 | 0.984 | 0.997 | 0.995 |

Figure 22
VLE expression for promoted MDEA and KS-1

$$P_{CO2}^* = K_{CO2} \; X_{CO2}$$

$$\ln K_{CO2} = A + \frac{B}{T} + C \gamma X^o_{amine} + D \left(\gamma X^o_{amine}\right)^{0.5} \left[\frac{\gamma}{1-\gamma}\right]$$

| | MDEA/PZ (4.28 M MDEA) (8.39 m MDEA) | KS-1 (8.39 m amine) |
|---|---|---|
| A | 32.45 | 32.45 |
| B | -7440 | -8870 |
| C | 33 | 52 |
| D | -18.5 | -15 |
| $X^o_{amine}$ | 0.1313 | 0.1313 |

Figure 23
Fit of KS-1 VLE data

| T (K) | $CO_2$ loading | KS-1 data $P_{CO2}^*$ (kPa) | Model |
|---|---|---|---|
| 313.15 | 0.375 | 0.7 | 1.0 |
| | 0.45 | 1.8 | 2.0 |
| | 0.5 | 3.1 | 3.0 |
| | 0.575 | 7.6 | 5.9 |
| 393.15 | 0.05 | 3.8 | 3.3 |
| | 0.0625 | 5.5 | 4.9 |
| | 0.21 | 51.7 | 57.3 |
| | 0.325 | 248.2 | 189.1 |

Figure 24
Results Calculated from the Equilibrium Models a. Equilibrium $CO_2$ loading (mol / mol Alk) at 313 K

| $P_{CO2}$ (kPa) | 6.4 m K+/ 1.6 m PZ | 5 m K+/ 2.5 m PZ | 4 m K+/ 4 m PZ | 7 m MEA | MEA/PZ (11.4 m MEA) | MDEA/PZ (8.4 m MDEA) | KS-1 (8.4 m amine) |
|---|---|---|---|---|---|---|---|
| 0.125 | 0.468 | 0.416 | 0.322 | 0.373 | 0.363 | 0.019 | 0.177 |
| 0.5 | 0.532 | 0.467 | 0.384 | 0.442 | 0.428 | 0.046 | 0.303 |
| 0.75 | 0.549 | 0.482 | 0.402 | 0.463 | 0.447 | 0.060 | 0.345 |
| 5 | 0.627 | 0.560 | 0.493 | 0.563 | 0.528 | 0.213 | 0.556 |
| 7.5 | 0.643 | 0.578 | 0.514 | 0.586 | 0.545 | 0.2701 | 0.602 |
| 10 | 0.654 | 0.592 | 0.529 | 0.602 | 0.556 | 0.317 | 0.633 | b. Calculated Heat of $CO_2$ Desorption (kJ/gmol $CO_2$)
Rich loading at $P_{CO2}$ given in Figure 14, Lean loading at 0.1 $P_{CO2}$
Absorber at 40 °C, Stripper at 100 °C

| | | | | | | | |
|---|---|---|---|---|---|---|---|
| Rich Abs | 62 | 74 | 70 | 77 | 80 | 62 | 73 |
| Rich Strip | 37 | 61 | 74 | 59 | 61 | 62 | 73 |
| Lean Abs | 52 | 63 | 66 | 84 | 86 | 62 | 73 |
| Lean Strip | 30 | 53 | 69 | 70 | 69 | 62 | 73 |
| Average | 45 | 63 | 70 | 73 | 74 | 62 | 73 |

Figure 25

Predicted performance of seven solvents and various stripper configurations (90% removal, $\Delta T = 5\ °C$, $P_{final} = 330\ kPa$)

| Solvent | | 6.4 m K+/ 1.6 m PZ | 5 m K+/ 2.5 m PZ | 4 m K+/ 4 m PZ | 7 m MEA | MEA/PZ | MDEA/PZ | KS-1 |
|---|---|---|---|---|---|---|---|---|
| $\Delta H_{abs}$ (kJ/gmol $CO_2$) | | 50 | 63 | 66 | 84 | 85 | 62 | 73 |
| Rich $P_{CO_2}$* (kPa) at 40 °C | | 5 | 5 | 7.5 | 5 | 7.5 | 7.5 | 5 |
| Capacity (mol $CO_2$/kg $H_2O$) | | 0.91 | 0.93 | 1.34 | 0.85 | 1.12 | 1.77 | 2.11 |
| Configuration | Pressure (kPa) | \multicolumn{7}{l|}{Equivalent Work (kJ/gmol $CO_2$)} |
| Baseline | 160 ($\Delta T=10\ °C$) | 28.1 | 24.9 | 21.4 | 22.3 | 20.0 | 18.3 | 19.1 |
| Improved Baseline | 160 | 27.4 | 22.6 | 19.0 | 19.7 | 17.5 | 17.2 | 17.9 |
| Multipressure | x/160 | 27.0 | 20.5 | 17.8 | 18.2 | 16.2 | 16.3 | 17.0 |
| Matrix | x | 180 | 265 | 295 | 280 | 295 | 295 | 295 |
| | x/160 | 24.3 | 21.7 | 15.6 | 18.0 | 15.7 | 15.1 | 16.1 |
| | x | 250 | 295 | 295 | 265 | 295 | 295 | 295 |
| | Feed split (%) | 120 | 40 | 20 | 25 | 25 | 30 | 30 |
| Internal Exchange | 160 | 25.3 | 19.5 | 17.3 | 17.5 | 16.0 | 15.7 | 16.5 |
| Multi P with 10% split feed | | 29.7 | 20.7 | 17.5 | 18.1 | 15.9 | 15.7 | 16.8 |
| Flashing feed | 160 | 23.5 | 20.7 | 18.0 | 18.7 | 16.8 | 16.3 | 17.2 |
| | Feed split (%) | 85 | 35 | 20 | 25 | 20 | 30 | 35 |
| Vacuum | 30 | 23.7 | 23.1 | 21.1 | 22.6 | 21.1 | 19.8 | 21.2 |
| Multipressure | x/30 | 23.7 | 22.5 | 20.2 | 21.6 | 19.9 | 19.2 | 20.7 |
| Matrix | x | 30 | 42 | 45 | 45 | 47 | 45 | 42 |
| | x/30 | 22.5 | 21.8 | 18.1 | 21.2 | 19.4 | 18.2 | 19.8 |
| | x | 42 | 45 | 47 | 50 | 45 | 45 | 45 |
| | Feed split (%) | 90 | 55 | 40 | 50 | 35 | 40 | 70 |
| Internal Exchange | 30 | 22.5 | 21.6 | 19.8 | 21.0 | 19.8 | 19.0 | 20.4 |
| Multi P with 10% split feed | | 31.3 | 22.6 | 20.2 | 21.6 | 19.7 | 19.9 | 20.7 |
| Flashing feed | 30 | 22.7 | 22.5 | 20.6 | 22.1 | 20.6 | 19.5 | 20.8 |
| | Feed split (%) | 55 | 35 | 35 | 35 | 30 | 35 | 45 | x = highest pressure in configuration

Figure 26

Contributions to reboiler duty - effect of temperature swing on simple strippers

|  | 6.4 m $K^+$/ 1.6 m PZ | | MEA/PZ | |
|---|---|---|---|---|
| P (kPa) | 30 | 160 | 30 | 160 |
| $\left(\dfrac{P_{CO2}}{P_{H2O}}\right)$ at rich end | 0.538 | 0.415 | 1.065 | 1.850 |
| $\Delta H_{des}$ (kJ/gmol $CO_2$) | 51 | 34 | 76 | 68 |
| $\left(\dfrac{n_{H2O}}{n_{CO2}}\right) H_{vap}$ (kJ/gmol $CO_2$) | 81 | 105 | 41 | 24 |
| $\left(\dfrac{L\, C_p\, \Delta T}{n_{CO2}}\right)$ (kJ/gmol $CO_2$) | 30 | 30 | 24 | 24 |
| Q (kJ/gmol $CO_2$) | 162 | 169 | 141 | 115 |

Figure 27

Constant in Generic Solvent VLE Expression

| $\Delta H_{abs}$ (kJ/gmol $CO_2$) | a |
|---|---|
| 42 | 3.82 |
| 63 | 11.85 |
| 83 | 19.89 |
| 105 | 27.92 |
| 126 | 35.96 |
| 146 | 43.99 |
| 167 | 52.03 |

Figure 30

Performance of matrix (265/160 kPa) stripper and normal pressure (160 kPa) for MEA (Rich loading = 0.563 mol $CO_2$/mol Alk, lean loading = 0.442 mol $CO_2$/ mol Alk, $\Delta T = 5°C$, $P_{final}$ = 330 kPa)

|  | P | Fraction of $CO_2$ removed | Q | $W_{comp}$ | Total $W_{eq}$ |
|---|---|---|---|---|---|
|  | kPa |  | kJ/gmol $CO_2$ | | |
| Matrix | 265 | 0.4 | 56 |  |  |
|  | 160 | 0.6 | 58 | 2.1 | 17.9 |
| 160 kPa | 160 | 1 | 123 | 2.9 | 19.7 |

Figure 31

Characteristics of the vacuum and vacuum internal exchange strippers for 7 m MEA (Rich loading = 0.563 mol $CO_2$/mol Alk, lean loading = 0.442 mol $CO_2$/ mol Alk, $\Delta T = 5\ °C$)

|  | Vacuum | Vacuum Internal Exchange |
|---|---|---|
| $\left(\dfrac{P_{CO2}}{P_{H2O}}\right)$ at rich end | 0.81 | 1.31 |
| $\Delta H_{des}$ (kJ/gmol $CO_2$) | 73 | 72 |
| $\left(\dfrac{n_{H2O}}{n_{CO2}}\right) H_{vap}$ (kJ/gmol $CO_2$) | 54 | 34 |
| $\left(\dfrac{L\ C_p\ \Delta T}{n_{CO2}}\right)$ (kJ/gmol $CO_2$) | 30 | 30 |
| Q (kJ/gmol $CO_2$) | 157 | 135 |

Figure 36

Energy requirement for separation and compression to 10 MPa

| Separation Method | $W_{sep}$ | $W_{comp}$ to 330 kPa | $W_{sep}$ + $W_{comp}$ to 330 kPa | $W_{comp}$ (330 kPa to 10 MPa) | Total $W_{eq}$ |
|---|---|---|---|---|---|
| | kJ/gmol $CO_2$ | | | | |
| Isothermal Sep. (40 °C, 100 kPa), Ideal Comp. | 7.3 | 3.1 | 10.4 | 7.7 | 18.1 |
| Isothermal Sep. (40 °C, 100 kPa), 75% adiabatic compression in 5 stages | 7.3 | 5.7 | 13.0 | 11.1 | 24.1 |
| Isothermal Sep. (40 °C), 75% adiabatic compression in 5 stages (Membrane-like) | 11.6 | 5.7 | 17.3 | 11.1 | 28.4 |
| Baseline (7m MEA, $\Delta T$ = 10 °C, 160 kPa) | 19.4 | 2.9 | 22.3 | 11.1 | 33.5 |
| Improved Baseline (7m MEA, $\Delta T$ = 5 °C, 160 kPa) | 16.8 | 2.9 | 19.7 | 11.1 | 30.9 |
| Matrix 4 m K$^+$/4m PZ (295/160) | 15.1 | 0.5 | 15.6 | 11.1 | 26.7 |
| Matrix MEA/PZ (295/160) | 15.2 | 0.5 | 15.7 | 11.1 | 26.8 |
| Matrix MDEA/PZ (295/160) | 14.6 | 0.5 | 15.1 | 11.1 | 26.2 |
| Matrix KS-1 (295/160) | 15.6 | 0.5 | 16.1 | 11.1 | 27.2 |
| Matrix 4 m K$^+$/ 4m PZ (47/30) | 9.6 | 8.5 | 18.1 | 11.1 | 29.1 |
| Matrix MEA/PZ (45/30) | 10.7 | 8.7 | 19.4 | 11.1 | 30.5 |
| Matrix MDEA/PZ (45/30) | 9.5 | 8.7 | 18.2 | 11.1 | 29.3 |
| Matrix KS-1 (45/30) | 11.1 | 8.7 | 19.8 | 11.1 | 30.9 |

ACIDIC GAS CAPTURE BY DIAMINES

CROSS-REFERENCE TO RELATED APPLICATIONS

This application claims the benefit of U.S. Provisional Application Ser. No. 61/019,646, filed Jan. 8, 2008, which is incorporated in this application by reference.

STATEMENT OF GOVERNMENT INTEREST

The present invention was made with support under contract number FC26-2NT41440 awarded by the Department of Energy. The U.S. government has certain rights in the invention.

BACKGROUND

As concerns of global climate changes spark initiatives to reduce carbon dioxide emissions, its economic removal from gas streams is becoming increasingly important. Removal by absorption/stripping is a commercially promising technology, as it is well suited to sequester carbon dioxide ($CO_2$). Such carbon dioxide emissions may be produced by a variety of different processes, such as the gas stream produced by coal-fired power plants. The removal of $CO_2$ can be an expensive process, potentially increasing the cost of electricity by 50% or more. Therefore, technology improvements to reduce the costs associated with the removal are highly desirable.

The removal of $CO_2$ from fuel gas and flue gas by absorption/stripping with aqueous amines is a disclosed and commercially practiced technology. A typical flowsheet for such a process is give by Kohl and Nielsen (1997) (FIG. 1). The gas at 30 to 50° C. containing $CO_2$ and inerts such as methane, hydrogen, or nitrogen is contacted countercurrently in a trayed or packed column with lean aqueous solvent entering at 30 to 50° C. The aqueous rich solvent containing 3 to 6 molar amine is heated by cross exchange with the hot lean solvent. The approach temperature for this exchanger has historically been 10 to 30° C. with a lean solution loading of 0.01 to 0.25 moles $CO_2$/mole amine. CO is removed from the solvent at 1.5-2 atm and 90-130° C. in a countercurrent reboiled stripper with trays or packing.

Commercially used amines that are used by themselves in water include monoethanolamine, diethanolamine, methyldiethanolamine, diglycolamine, diisopropanolamine, some hindered amines, and others (Kohl and Nielsen (1997)). These amines are soluble or miscible with water at ambient temperature at high concentrations that are used in the process to maximize capacity and reduce sensible heat requirements. Other amines, including piperazine, are used in combination with methyldiethanolamine and other primary amines.

A number of mono- and polyamines, including piperazine, are identified as potentially useful solvent components but have not been used because they are insufficiently soluble in water when used by themselves. Piperazine is a diamine that has previously been studied as a promoter for amine systems to improve kinetics. In water at 25° C., solid piperazine has a solubility less than 2 M, so it cannot be used in traditional systems at concentrations that give adequate $CO_2$ capacity for good energy performance. BASF has disclosed the used of piperazine in combination with other amines (such as alkanolamines) or highly water soluble organics (such as triethyleneglycol) to promote the water solubility of piperazine.

It has also been claimed that number of potentially useful amines such as piperazine would be too volatile if used in high concentrations in aqueous solvents. The boiling point of piperazine (146.5° C.) is lower that that of monoethanolamine (170° C.), so the use of Raoult's law would suggest that it would have a greater volatility at the top of the absorber.

DRAWINGS

Some specific example embodiments of the disclosure may be understood by referring, in part, to the following description and the accompanying drawings.

Figure 8:
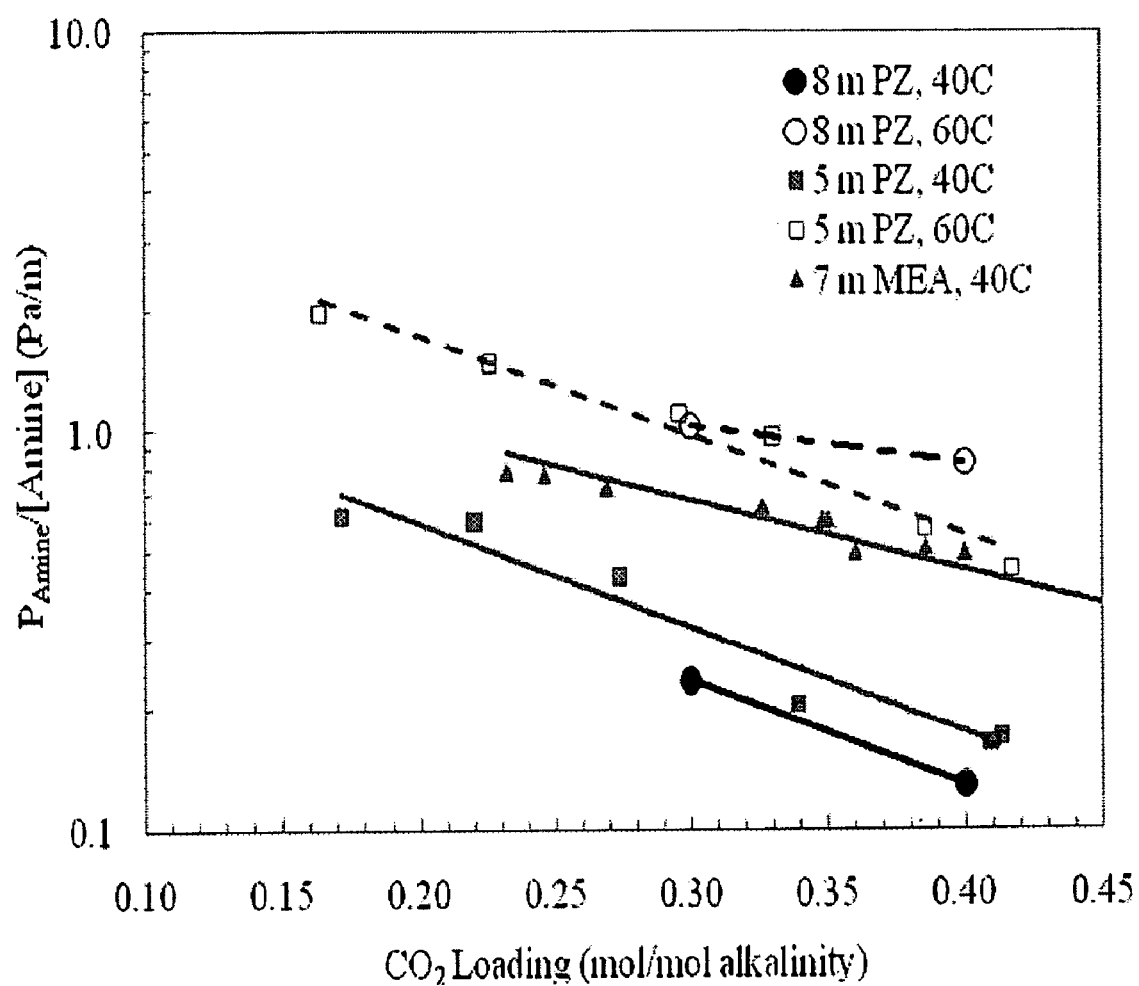

FIG. 8 the comparison of mass transfer coefficients in PZ and MEA.

FIG. 8 shows a plot of PZ and MEA volatility normalized to amine concentration.

Figure 9:
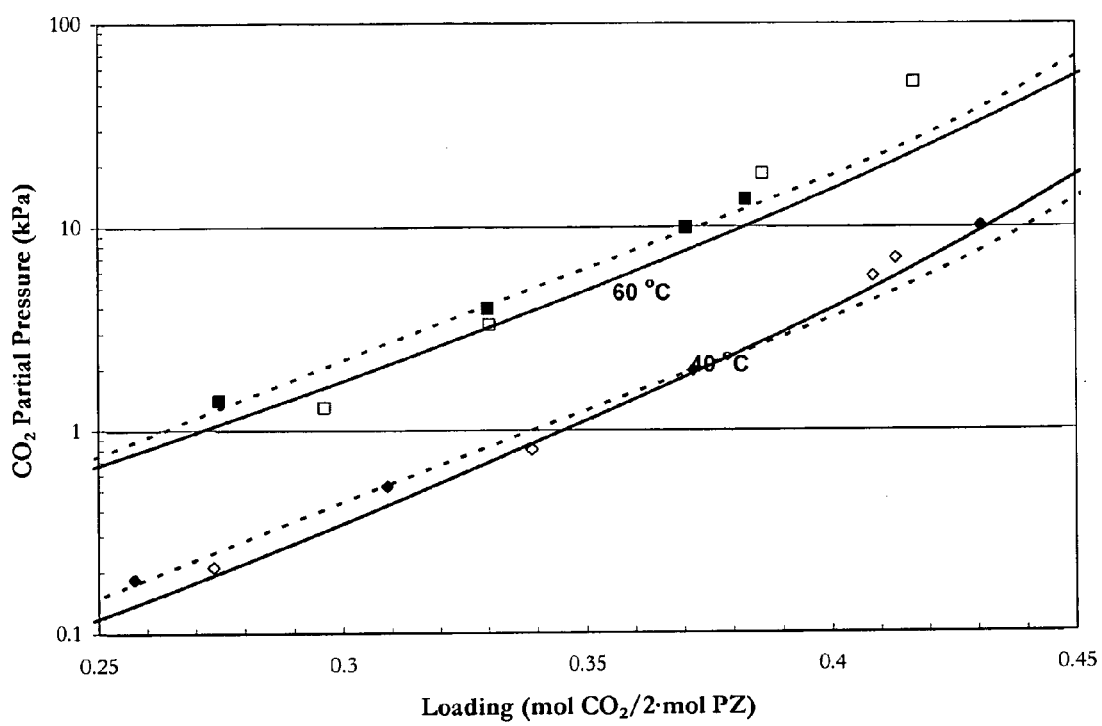

FIG. 9 shows a plot of $CO_2$ solubility in 2 and 5 m piperazine.

Figure 10:
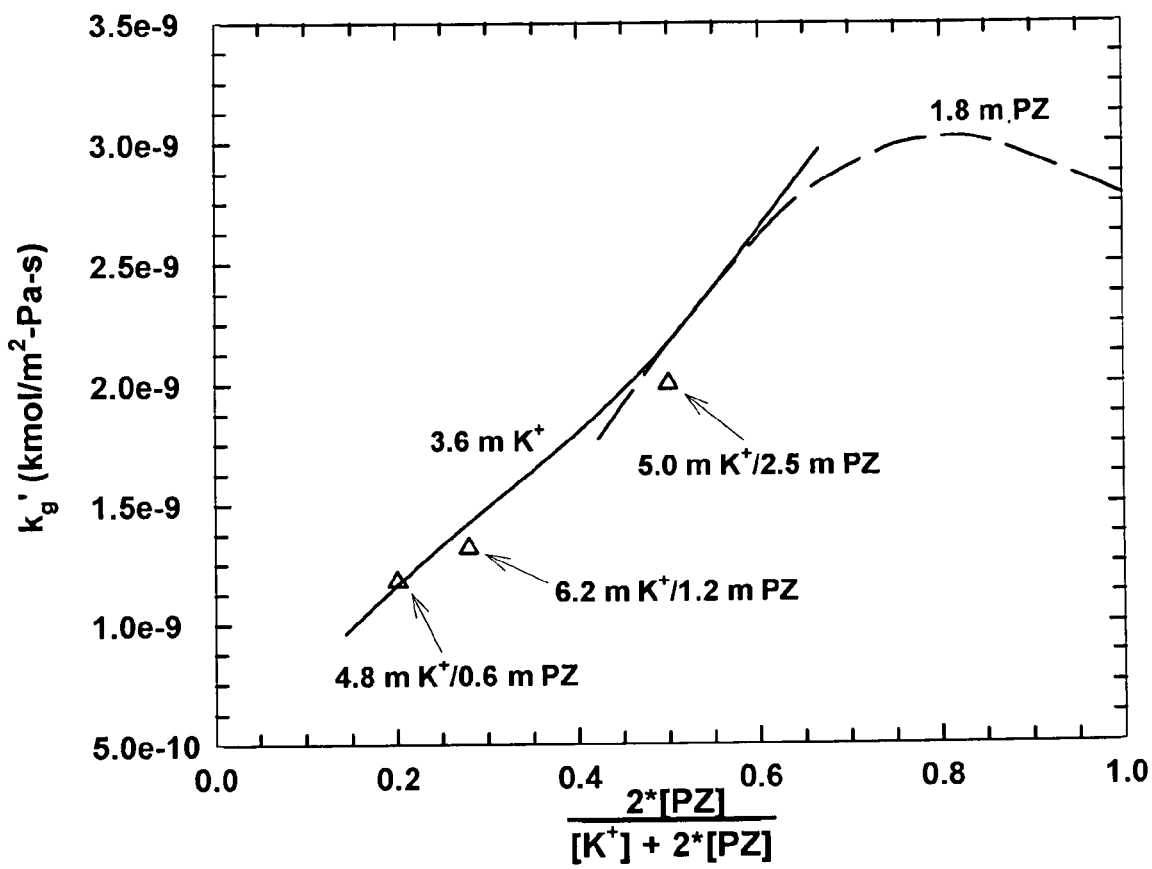

FIG. 10 shows the effect of $K^+$/PZ Ratio on the absorption rate of $CO_2$ at 60° C. and $P_{CO_2}^*$=1,000 Pa, $k_1^\circ$=1.0×10$^{-4}$ m/s, $P_{CO_2},i$=1.05×$P_{CO_2}^*$.

Figure 11:
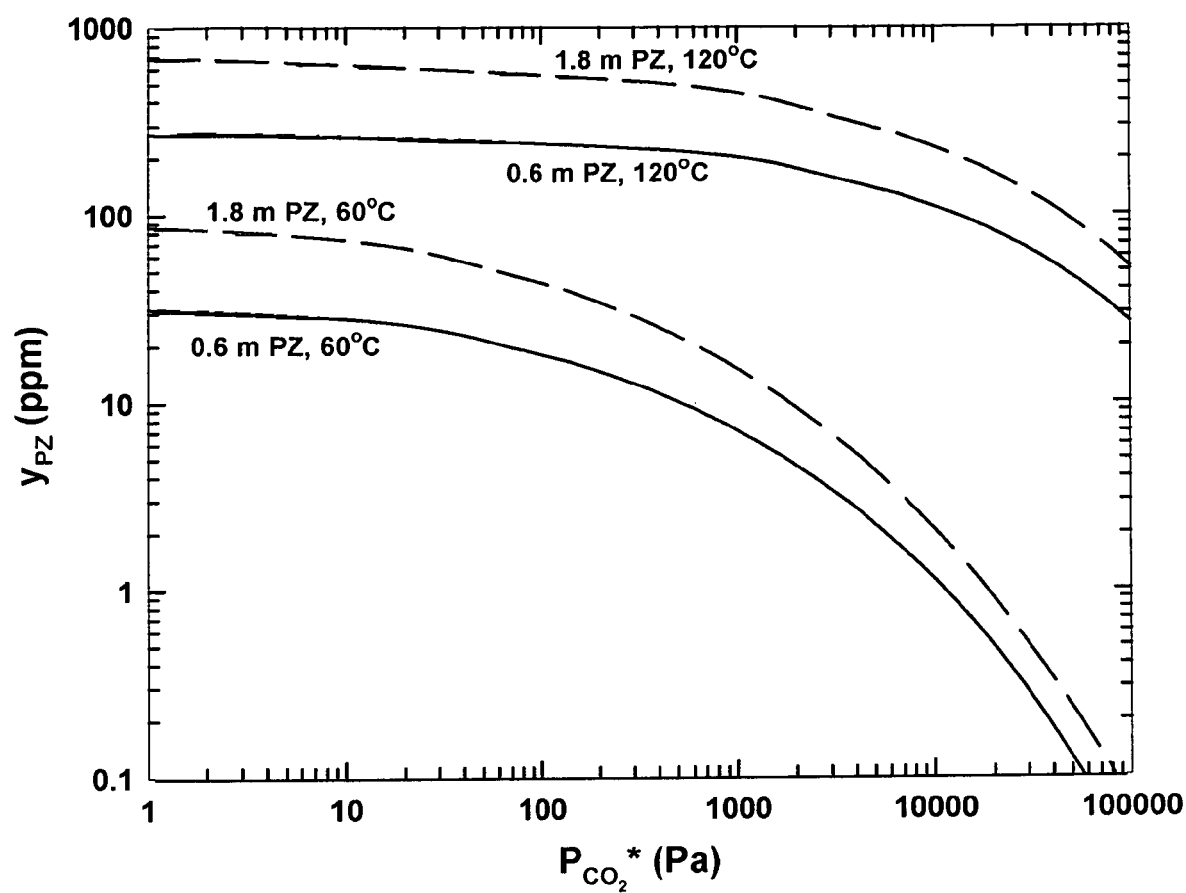

FIG. 11 shows a plot of the volatility of PZ in aqueous solution predicted by the ENRTL Model.

Figure 12:
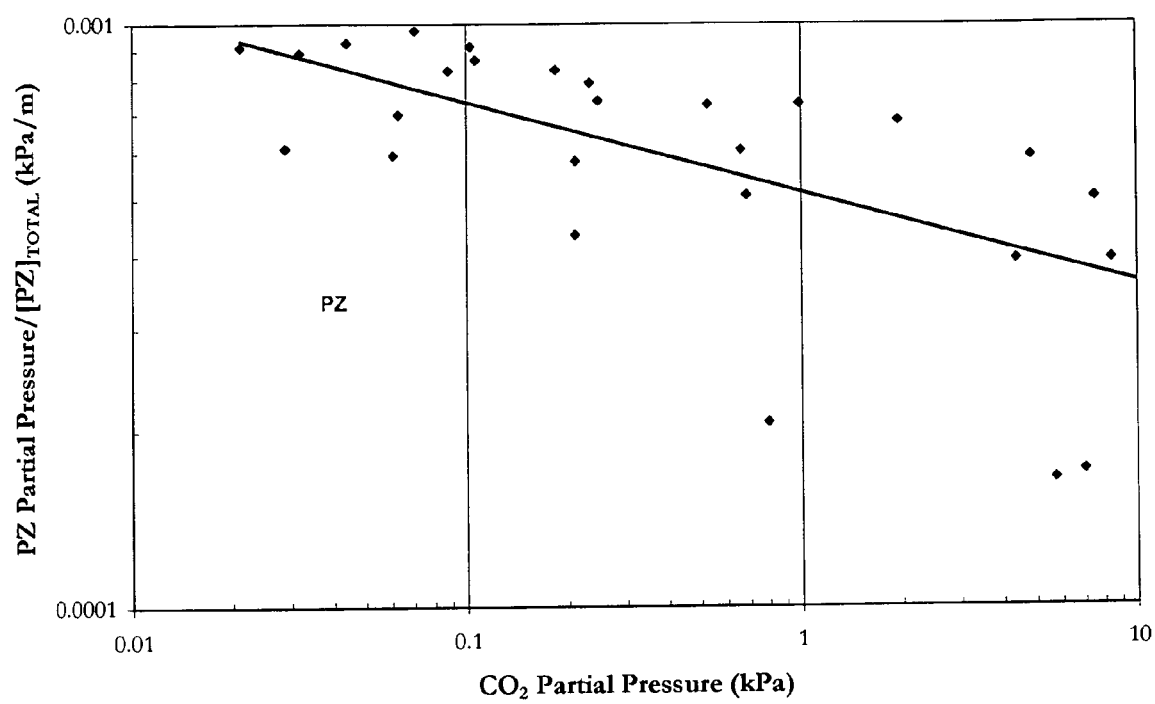

FIG. 12 shows a plot of the volatility of piperazine in solutions loaded with $CO_2$ at 40° C., PZ varies from 0.6 to 5 m.

Figure 13:
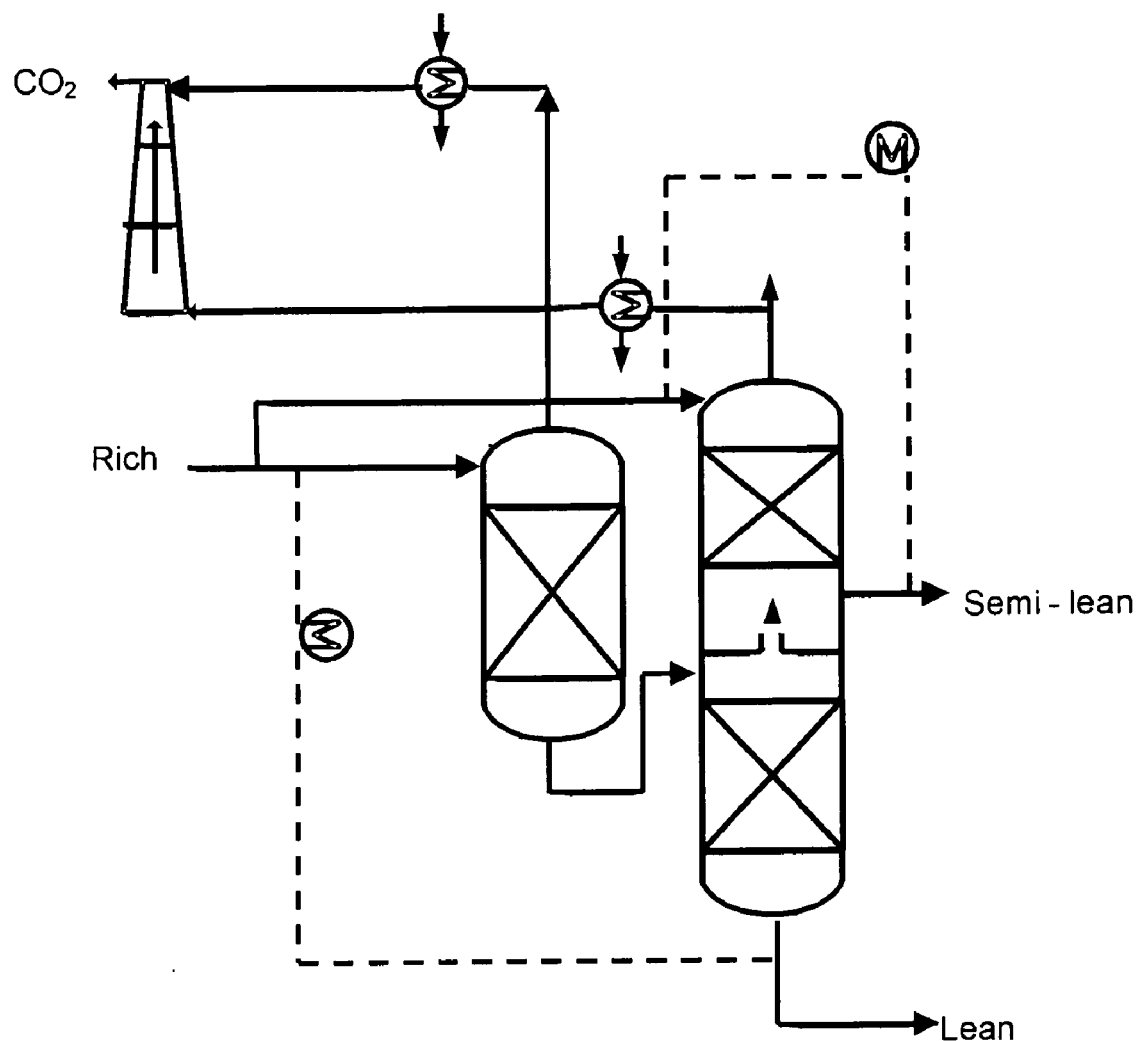

FIG. 13 shows an exemplary double-matrix stripper configuration.

Figure 14:
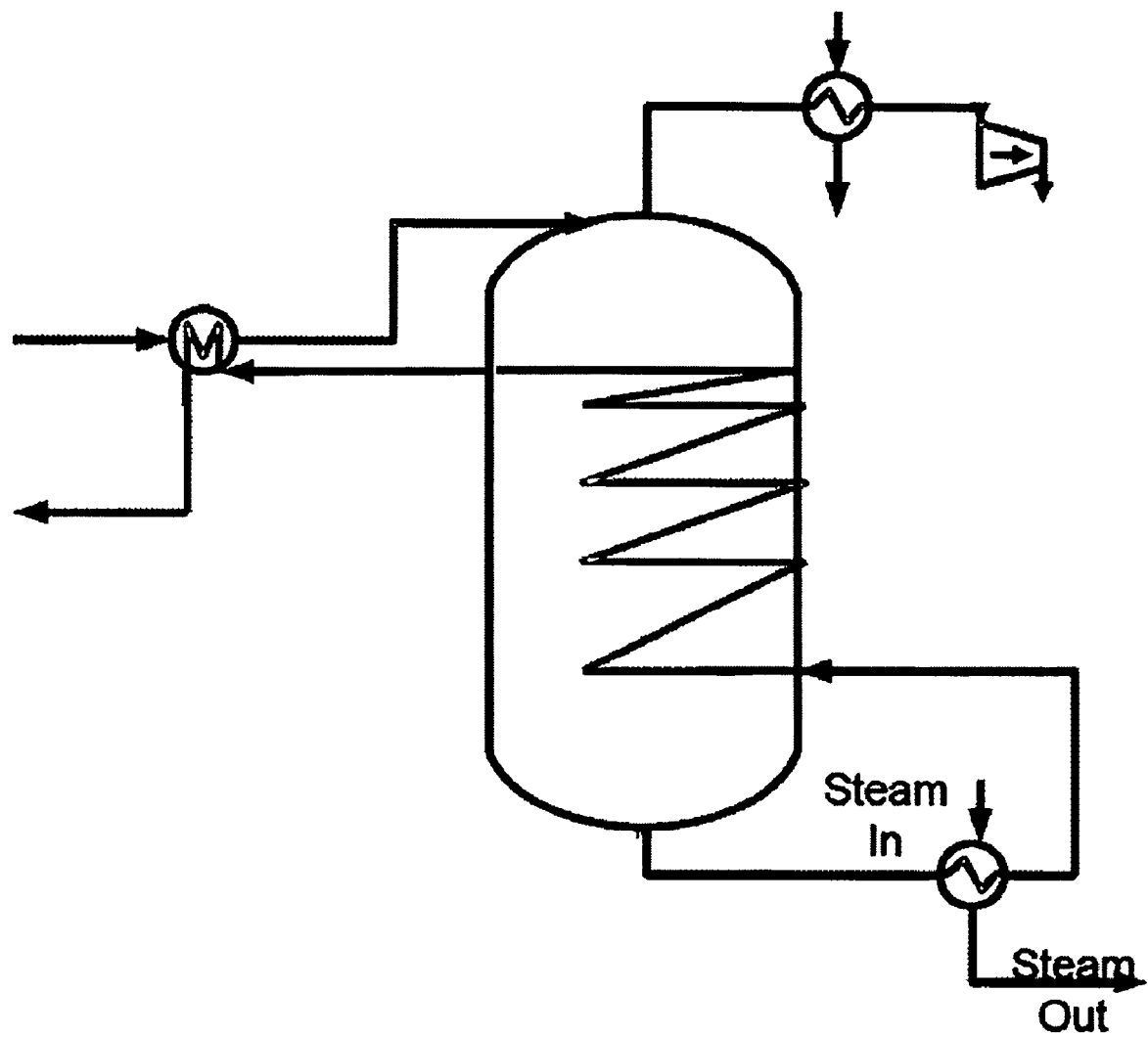

FIG. 14 shows an exemplary internal exchange stripper configuration.

Figure 15:
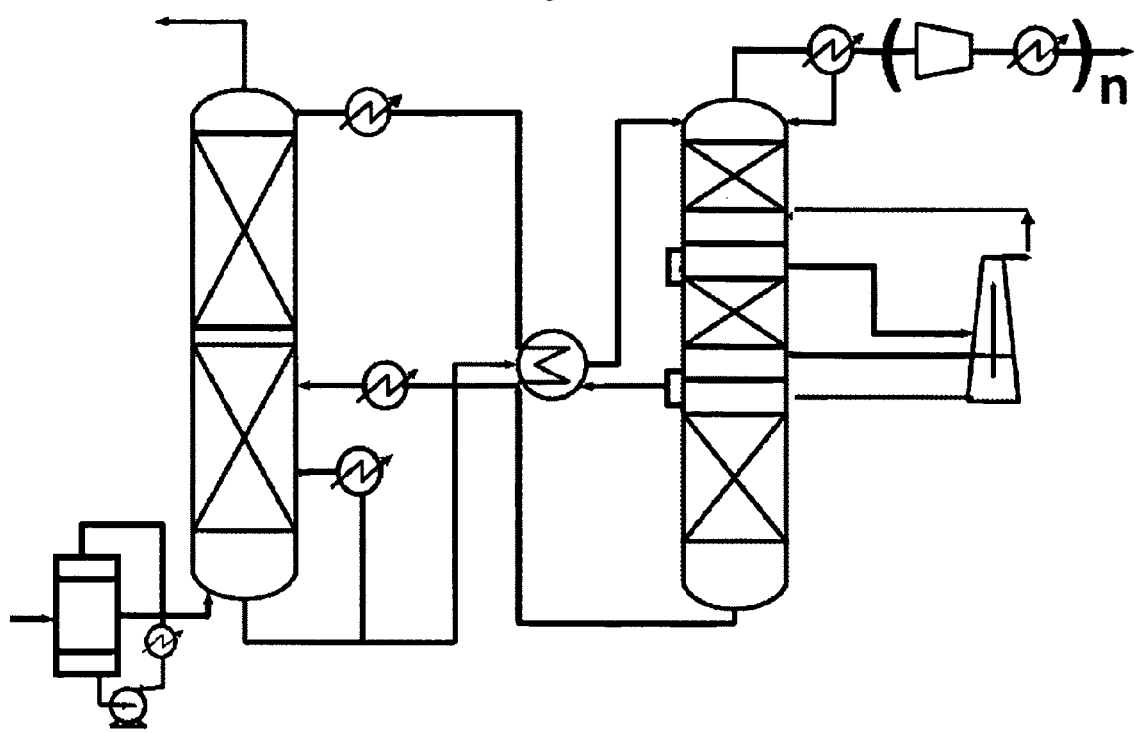

FIG. 15 shows an exemplary multipressure stripper configuration with a split feed.

Figure 16:
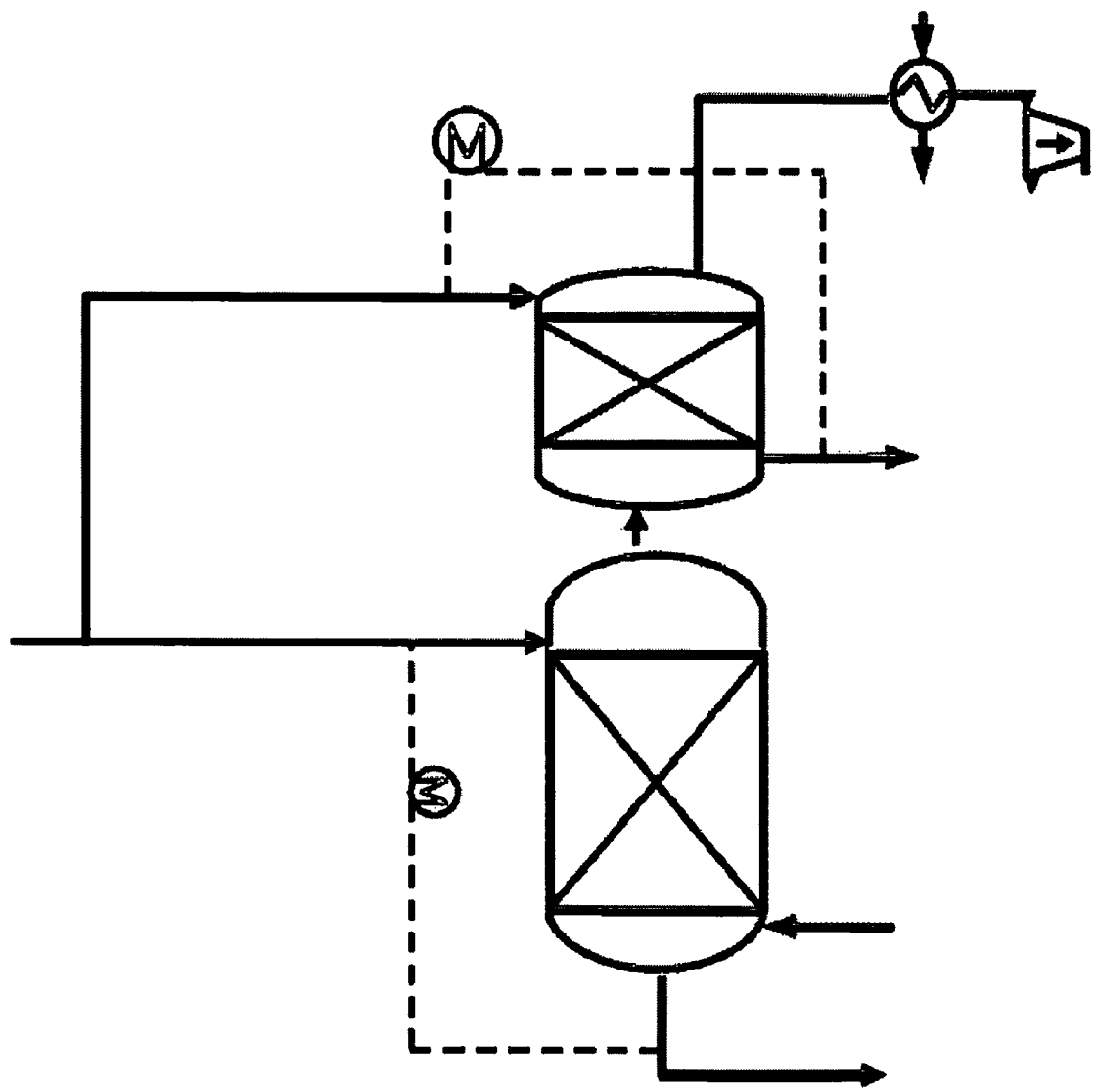

FIG. 16 shows an exemplary flashing feed stripper configuration.

Figure 17:
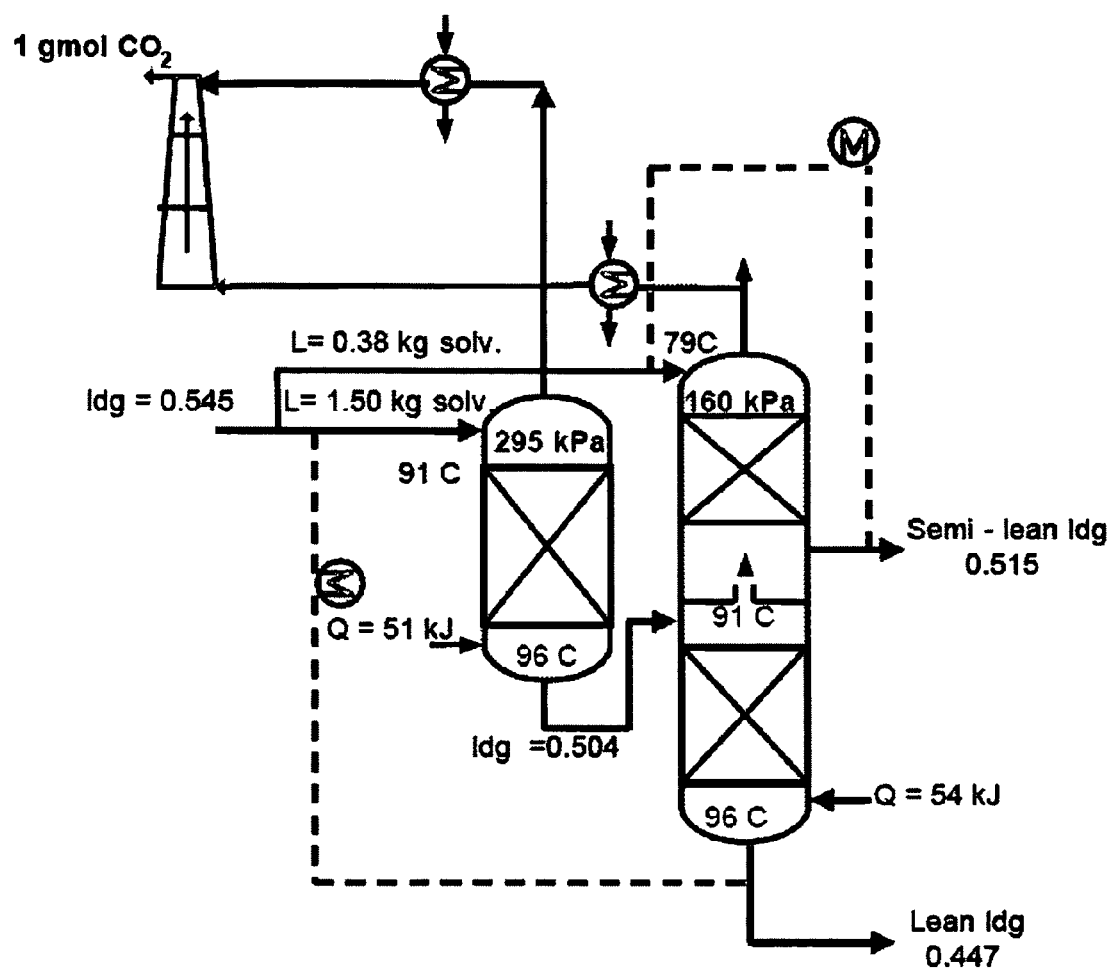

FIG. 17 shows an exemplary double-matrix stripper configuration with exemplary operating parameters.

Figure 18:
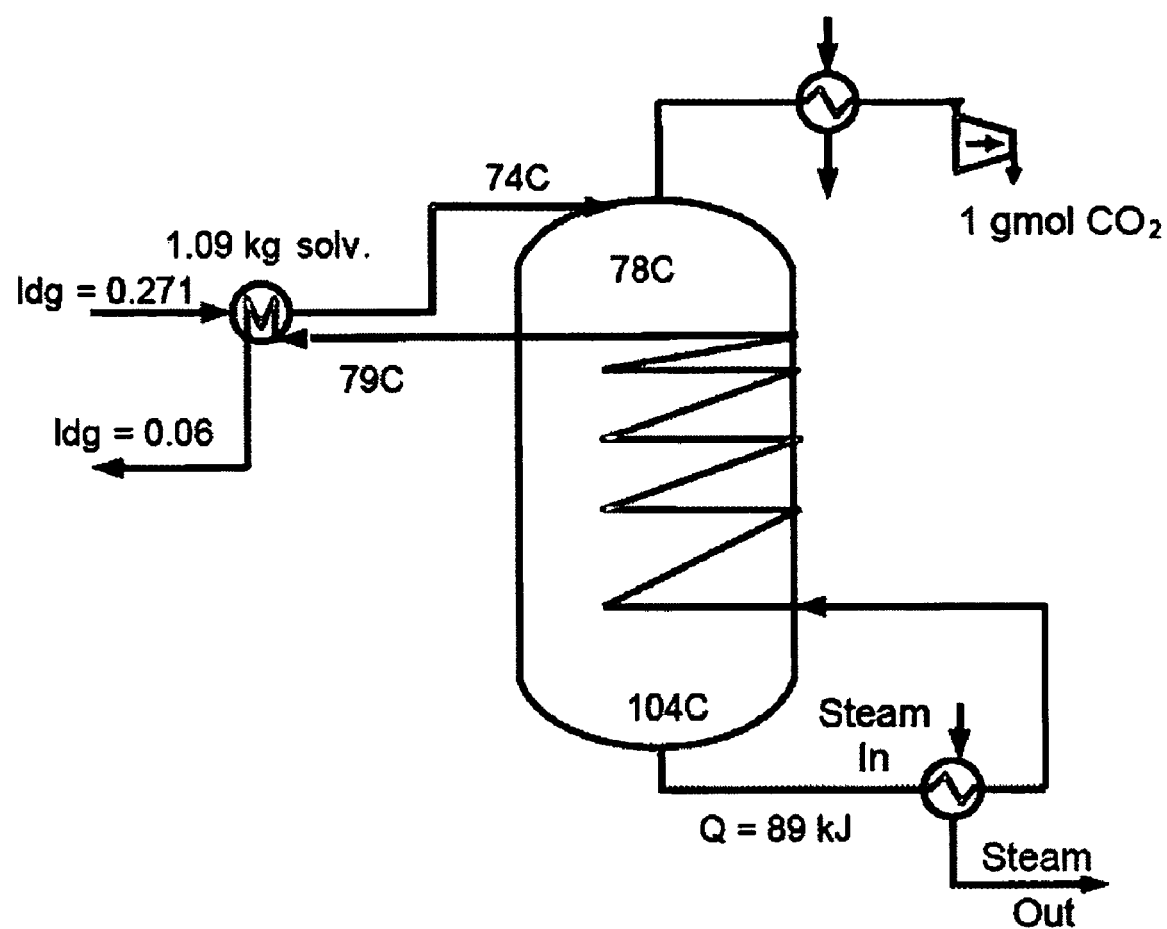

FIG. 18 shows an exemplary internal exchange stripper configuration with exemplary operating parameters.

Figure 19:
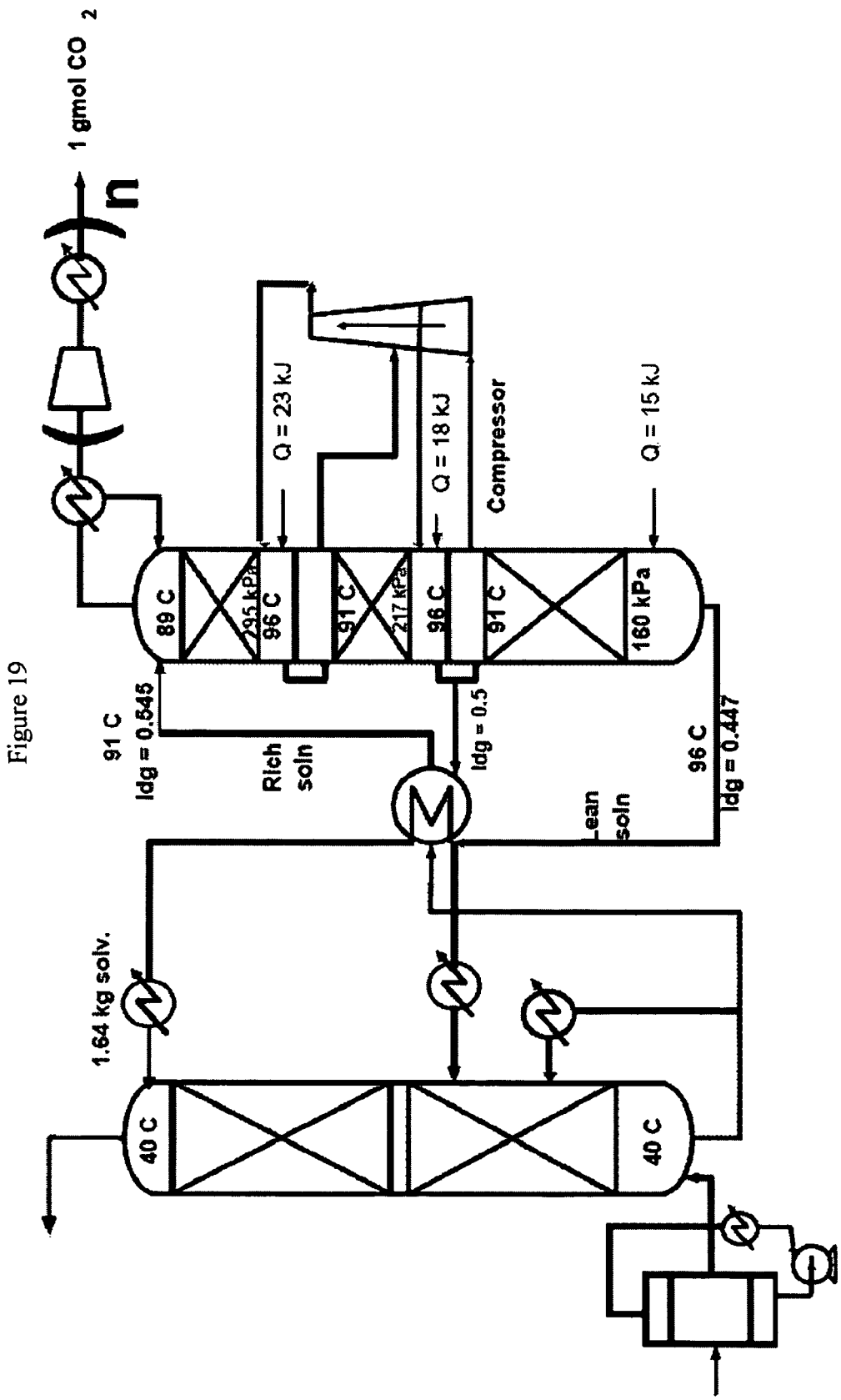

FIG. 19 shows an exemplary multipressure stripper configuration with a split feed with exemplary operating parameters.

Figure 20:
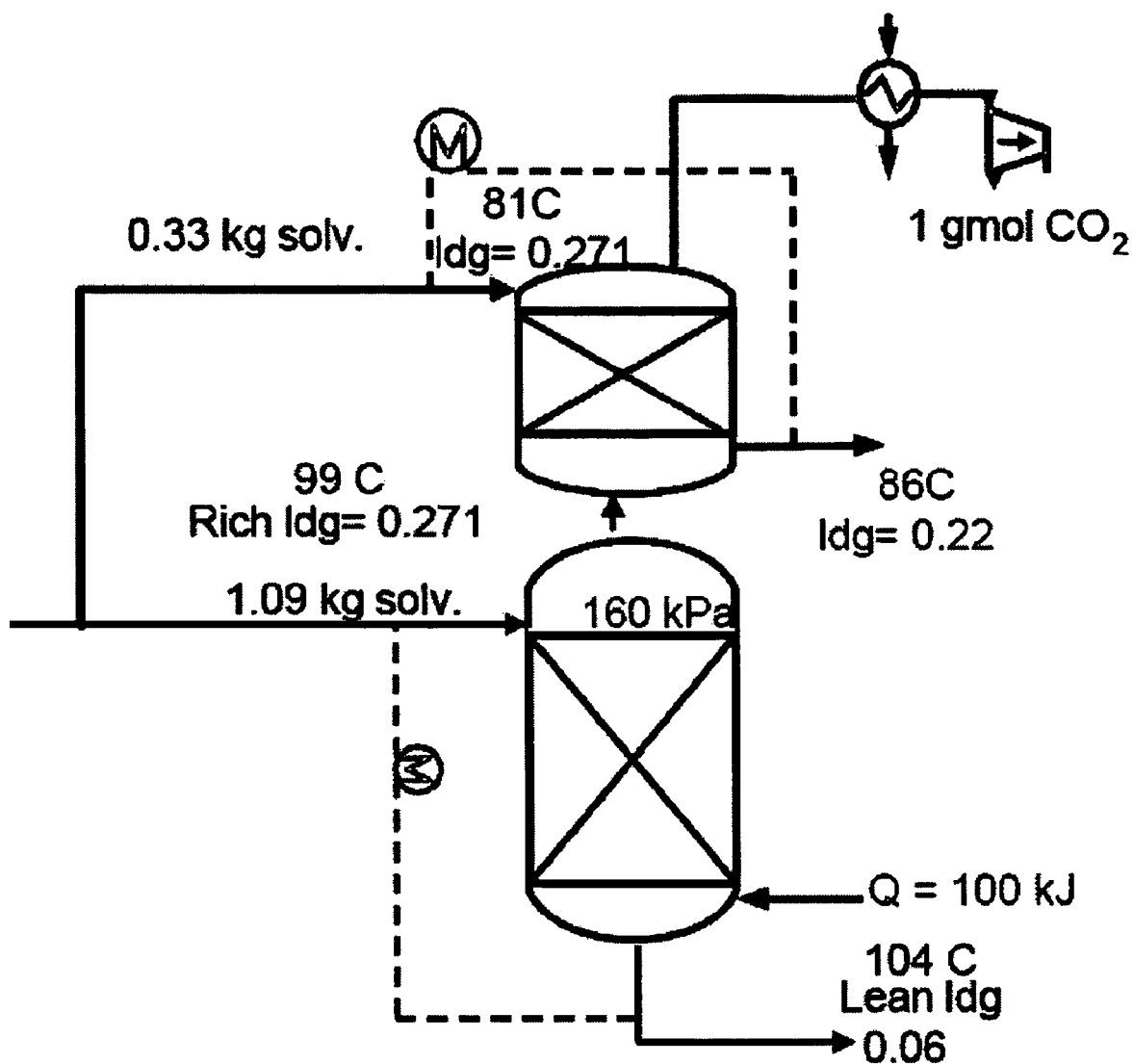

FIG. 20 shows an exemplary flashing feed stripper configuration with exemplary operating parameters.

FIG. 21 shows a table of VLE expression for $PZ/K_2CO_3$, MEA, and promoted MEA.

FIG. 22 shows a table of VLE expression for promoted MDEA and KS-1.

FIG. 23 shows a table of the fit of KS-1 VLE Data.

FIG. 24 shows a table of the results calculated from the equilibrium models.

FIG. 25 shows a table of the predicted performance of different solvents using various stripper configurations (90% removal, $\Delta T$=5 K, $P_{final}$=330 kPa).

FIG. 26 shows a table of contributions to reboiler duty and the effect of temperature swing on simple strippers.

FIG. 27 shows a table of values for the constant a in the generic solvent VLE equation.

Figure 28:
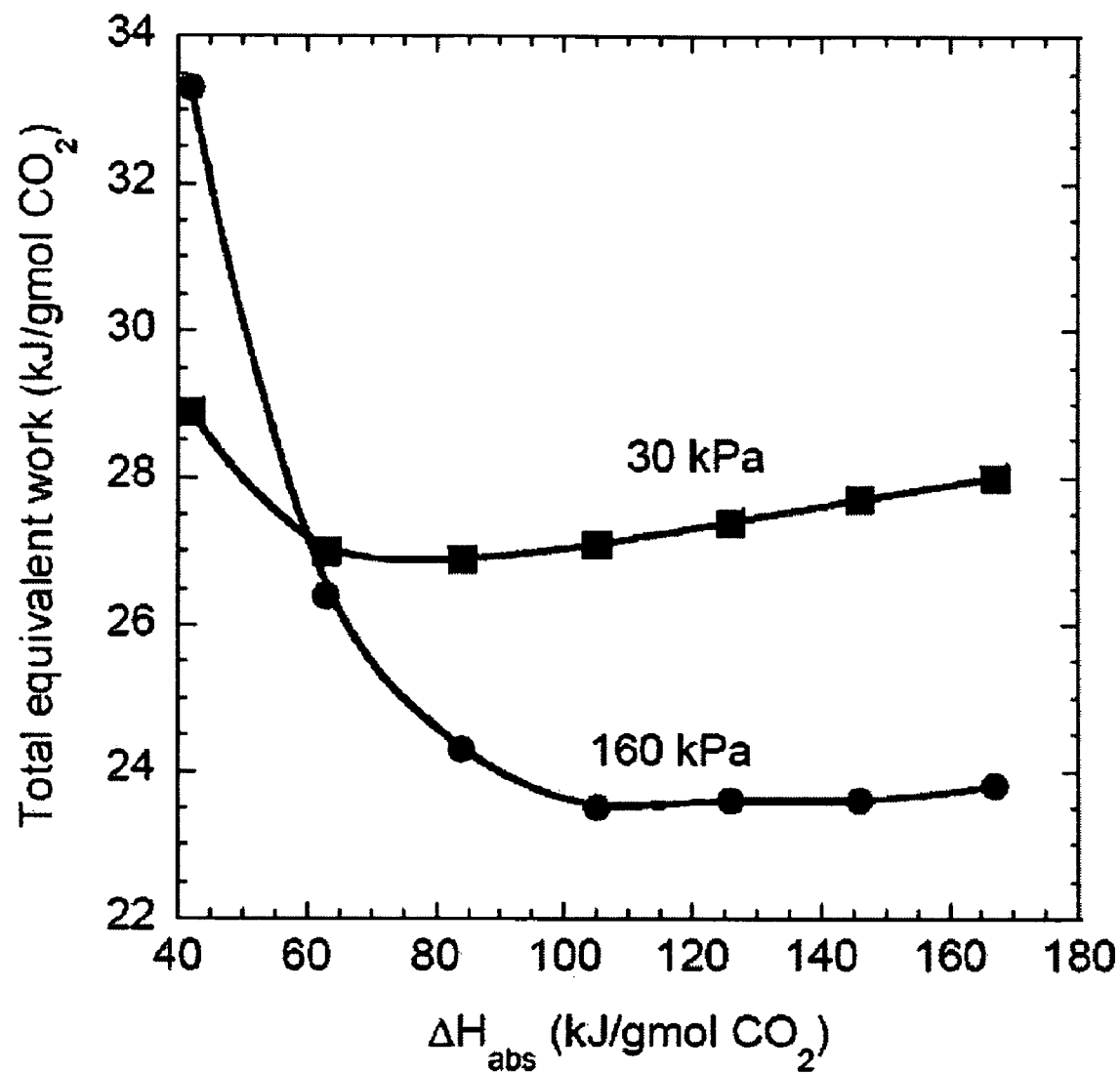

FIG. 28 shows a plot of total equivalent work for generic solvents (rich $P_{CO_2}$*=5 kPa at 313 K, $\Delta T$=5 K, 90% removal, $P_{final}$=1000 kPa).

Figure 29:
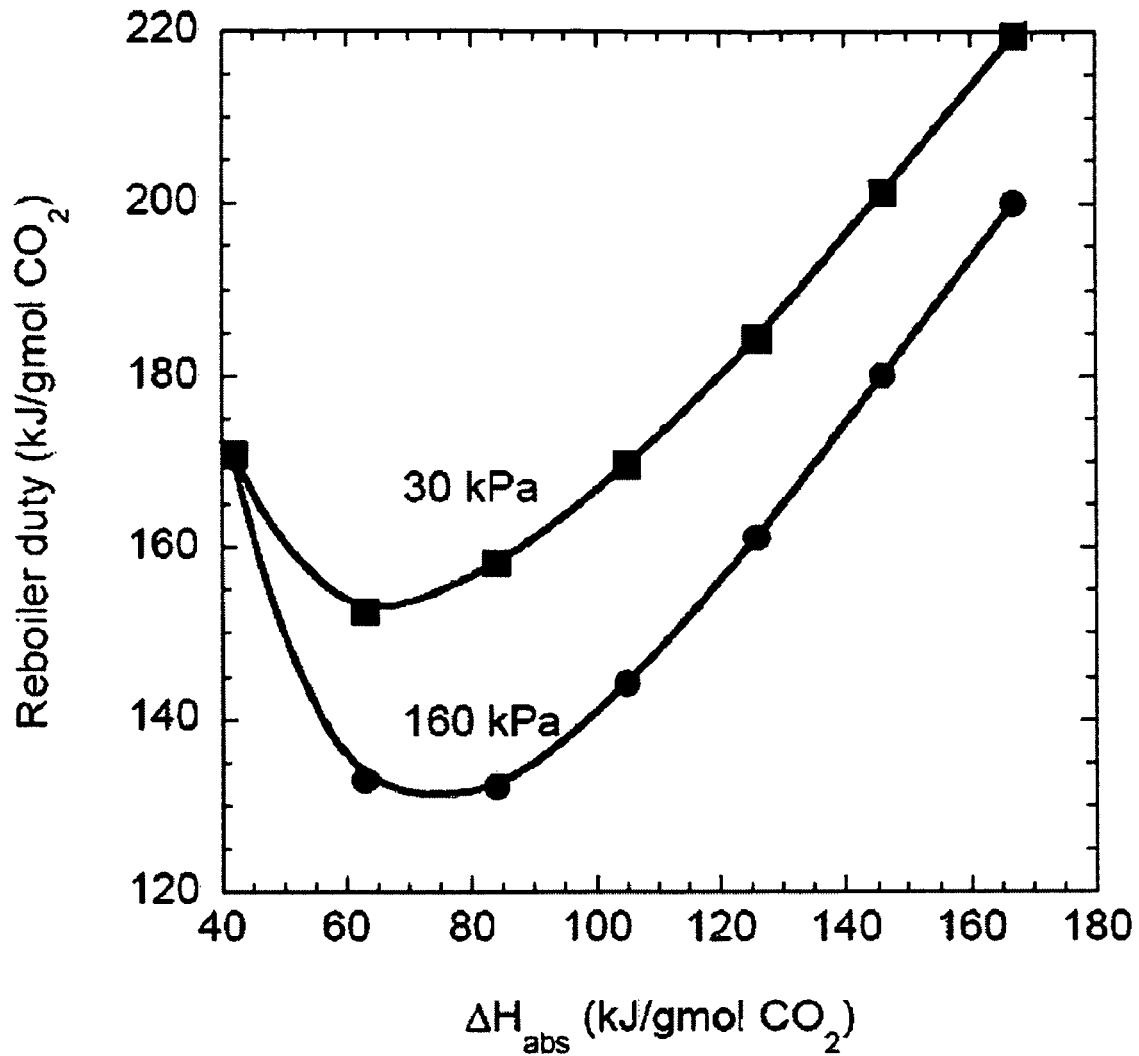

FIG. 29 shows a plot of reboiler duty for generic solvents (rich $P_{CO_2}$*=5 kPa at 313 K, $\Delta T$=5 K, 90% removal).

FIG. 30 shows a table of performance of matrix (265/160 kPa) stripper and normal pressure (160 kPa) for MEA (rich loading=0.563 mol $CO_2$/mol Alk, lean loading=0.442 mol $CO_2$/mol Alk, $\Delta T$=5 K, $P_{final}$ 5 330 kPa).

FIG. 31 shows characteristics of the vacuum and vacuum internal exchange strippers for 7 m MEA (rich loading=0.563 mol $CO_2$/mol Alk, lean loading=0.442 mol $CO_2$/mol Alk, $\Delta T$=5 K).

Figure 32:
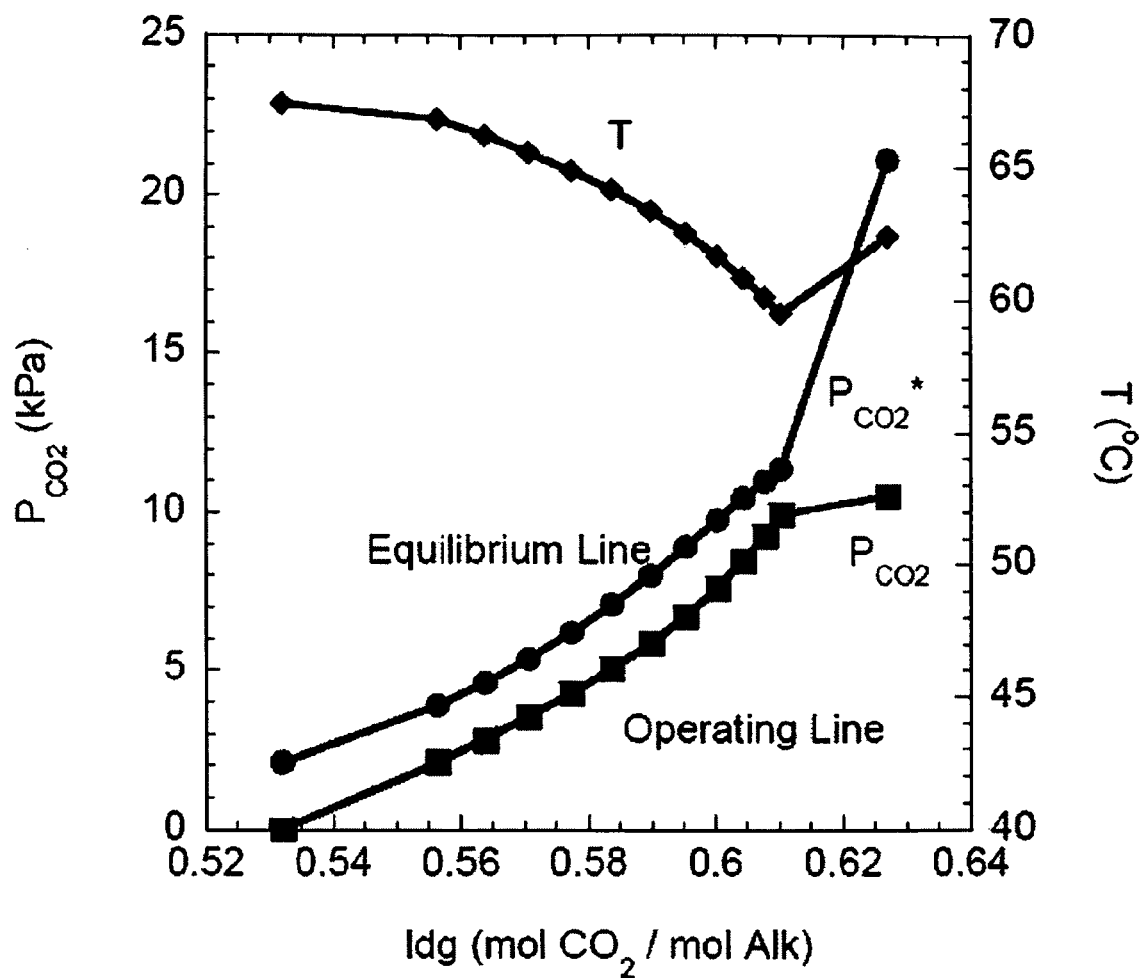

FIG. 32 shows a McCabe-Thiele plot for 30 kPa stripper using 6.4 m K1/1.6 m PZ with 10 segments (rich loading=0.627 mol $CO_2$/mol Alk, lean loading=0.532 mol $CO_2$/mol Alk, $\Delta T$=5 K).

Figure 33:
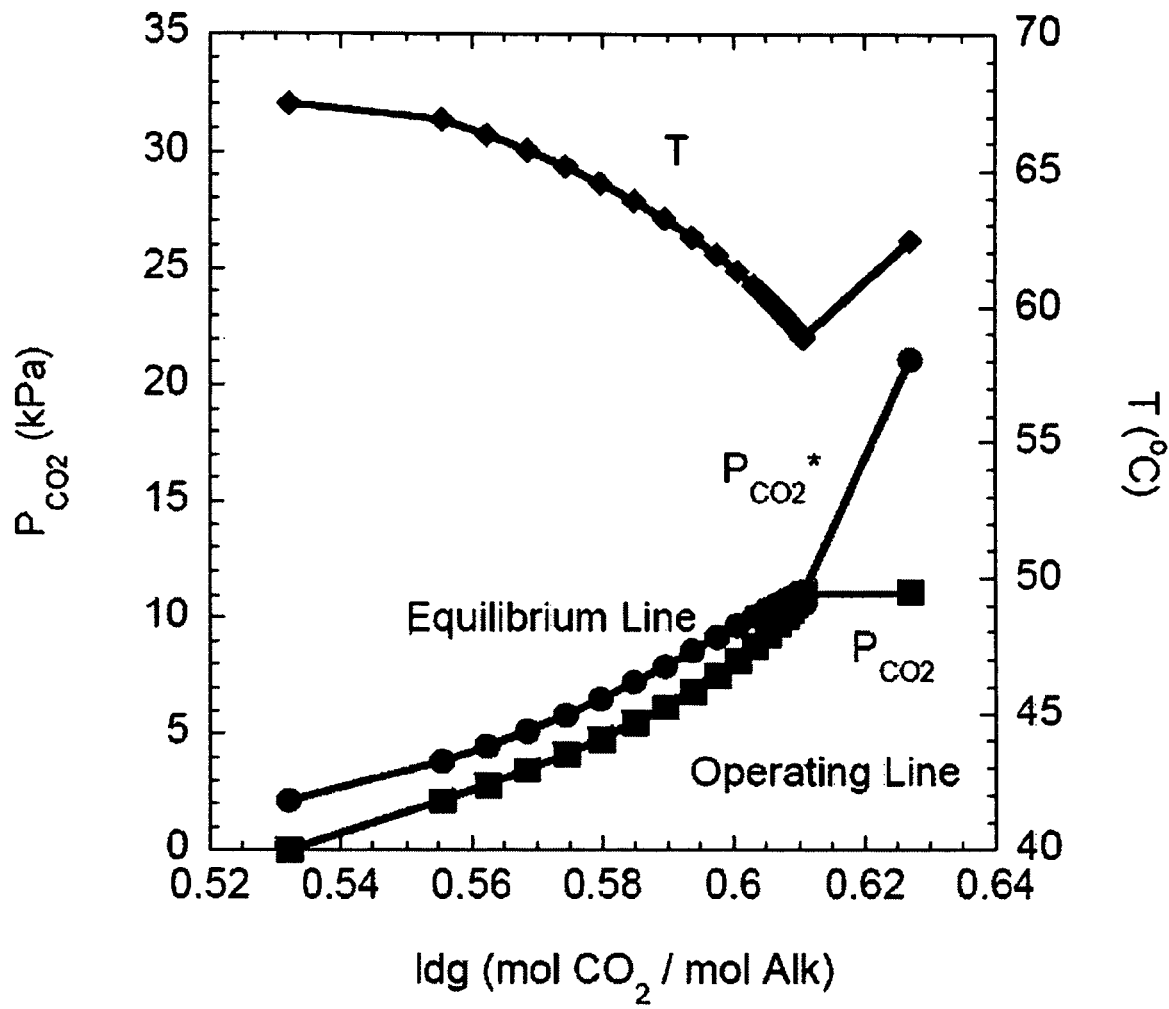

FIG. 33 shows a McCabe-Thiele plot for 30 kPa stripper using 6.4 m K1/1.6 m PZ with 22 segments (rich loading=0.627 mol $CO_2$/mol Alk, lean loading=0.532 mol $CO_2$/mol Alk, $\Delta T$=5 K).

Figure 34:
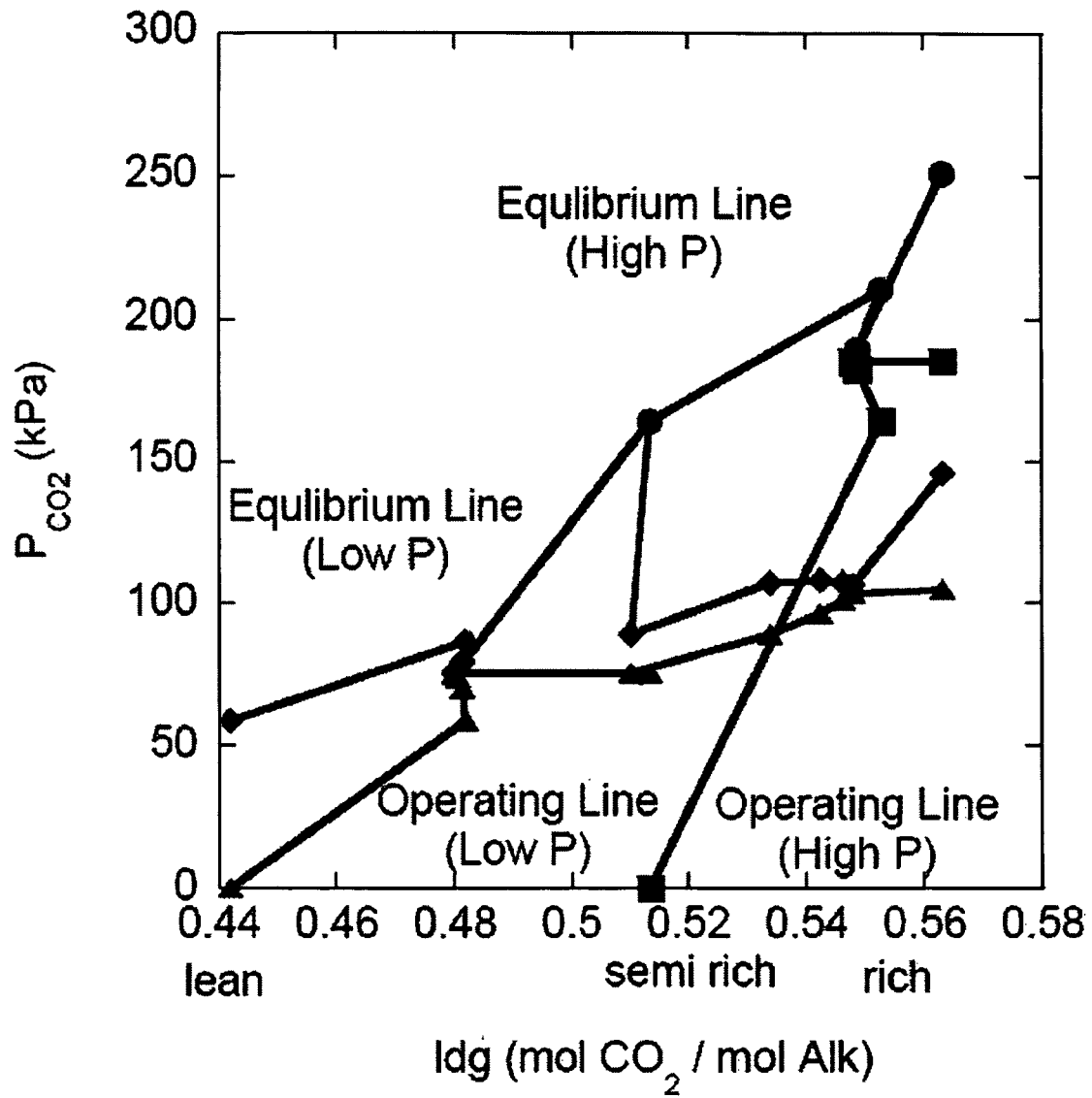

FIG. 34 shows a McCabe-Thiele plot for a matrix (265/160 kPa) stripper using 7 m MEA (rich loading=0.563 mol $CO_2$/mol Alk, lean loading=0.442 mol $CO_2$/mol Alk, $\Delta T$=5 K).

Figure 35:
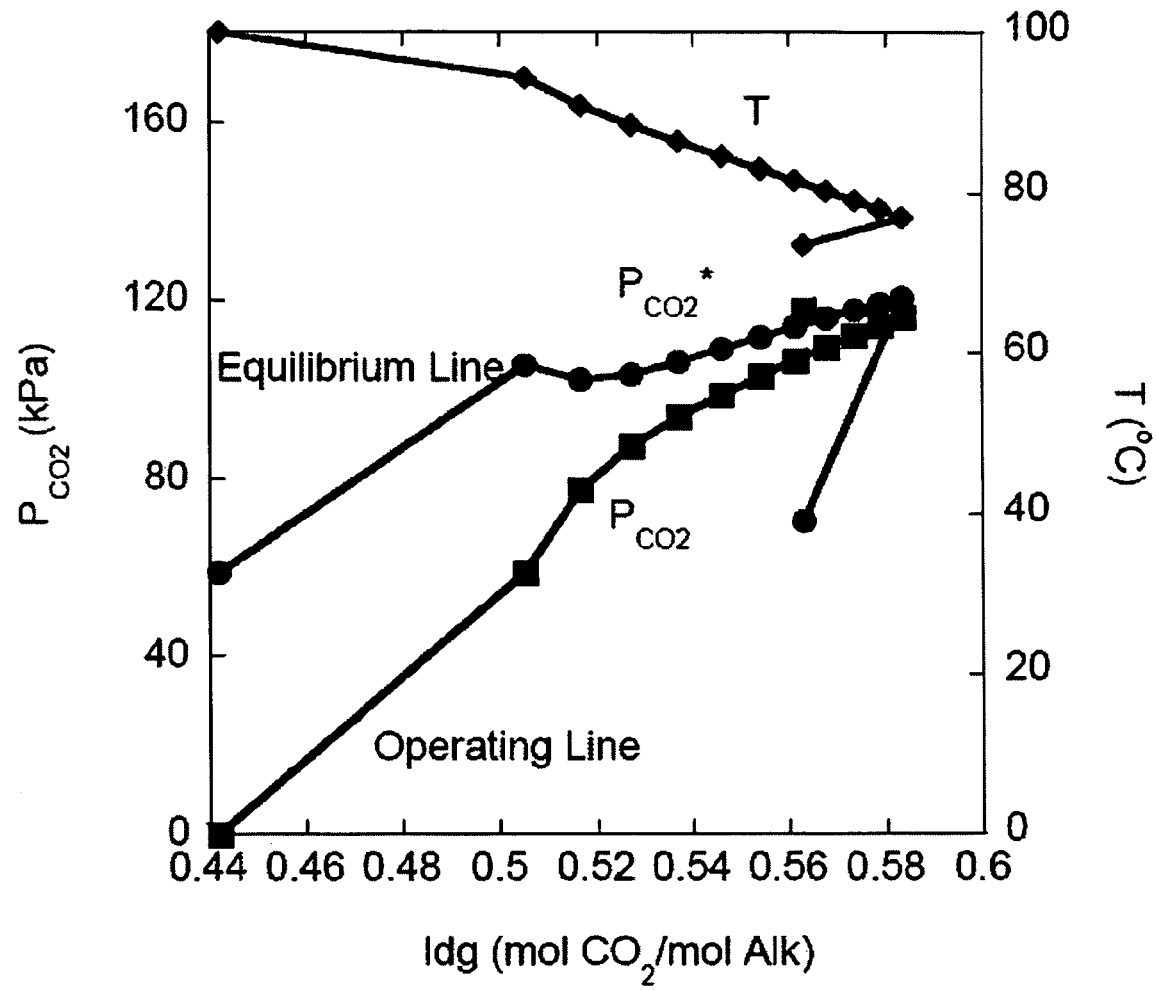

FIG. 35 shows a McCabe-Thiele plot for an internal exchange stripper using 7 m MEA at 160 kPa (rich loading=0.563 mol $CO_2$/mol Alk, lean loading=0.442 mol $CO_2$/mol Alk, $\Delta T$=5 K).

FIG. 36 shows a table of energy requirement for separation and compression to 10 MPa.

Figure 37:
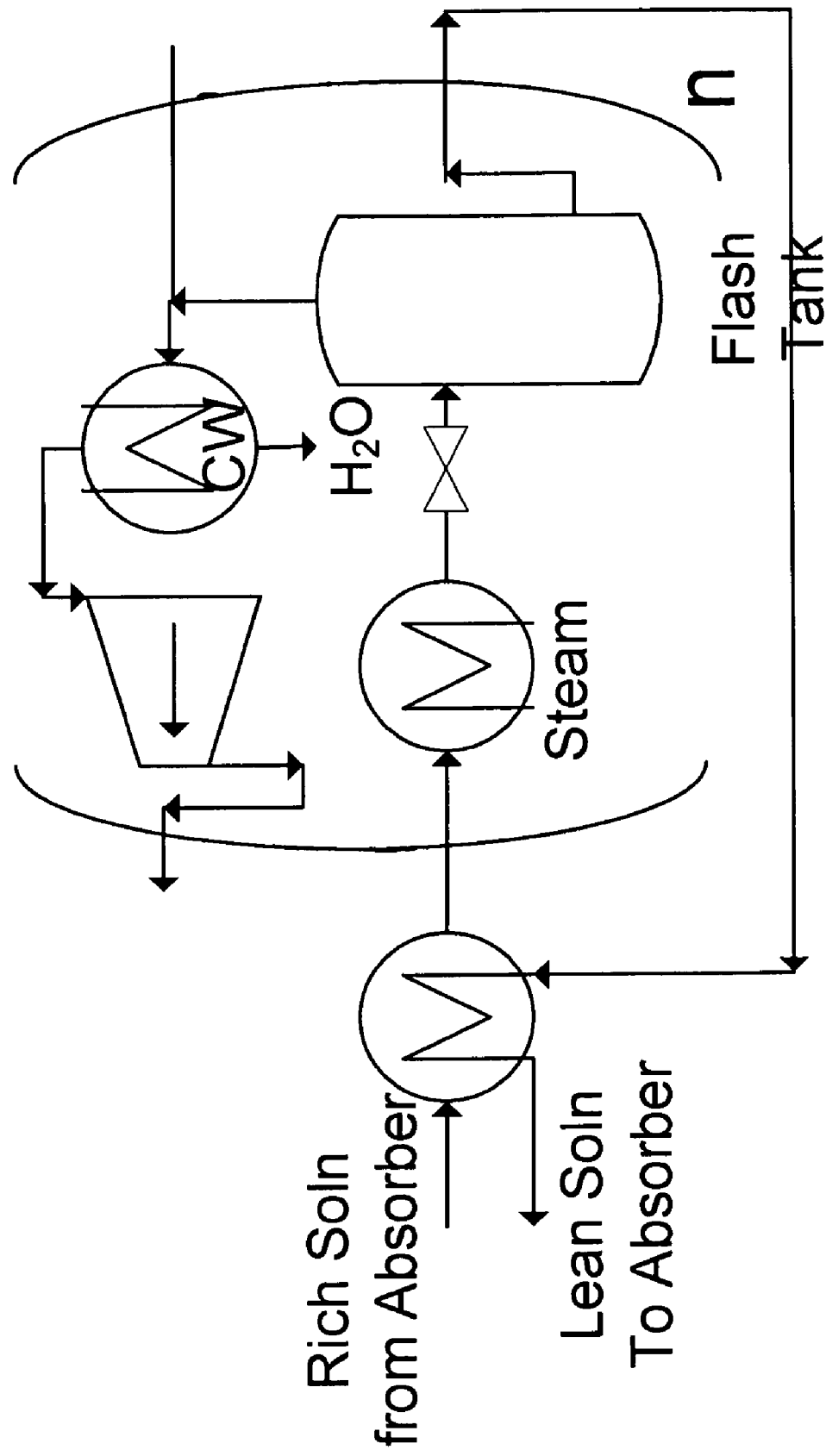

FIG. 37 shows an exemplary multi stage flash stripper configuration.

The patent or application file contains at least one drawing executed in color. Copies of this patent or patent application publication with color drawing(s) will be provided by the Office upon request and payment of the necessary fee.

While the present disclosure is susceptible to various modifications and alternative forms, specific example embodiments have been shown in the figures and are described in more detail below. It should be understood, however, that the description of specific example embodiments is not intended to limit the invention to the particular forms disclosed, but on the contrary, this disclosure is to cover all modifications and equivalents as illustrated, in part, by the appended claims.

DESCRIPTION

The present disclosure, according to certain embodiments, generally relates to compositions, systems, and methods for the removal of acidic gas. In particular, the present disclosure relates to compositions, systems, and methods for the removal of acidic gas from a gas mixture using a solvent comprising a diamine (e.g., piperazine) and carbon dioxide. Suitable diamines include those that are volatile or insoluble at normal conditions, for example, piperazine, ethylenediamine, and various substituted ethylenediamines (e.g., methylethylenediamine, dimethylethylenediamine, ethylethylenediamine, and diethylethylenediamine), and piperazine (e.g., methylpiperazine, dimethylpiperazine, ethylpiperazine, and diethylpiperazine).

The present disclosure is based in part on the discovery of optimum stripper process configurations and operating conditions that result in unexpectedly high lean loading of $CO_2$. Such process configurations may include the matrix, internal exchange, flashing feed, and multipressure processes described herein. Such operating conditions may include an unexpectedly low exchanger approach temperature. In some embodiments, such exchanger approach temperatures may be approximately 5° C.

The present disclosure is also based in part on the discovery that diamines (e.g., piperazine) may be less volatile in an aqueous solution than expected from Raoult's law. In certain embodiments, the activity coefficient of piperazine at infinite dilution in water may be about 0.05, whereas monoethanolamine (MEA) has an activity coefficient of about 0.16.

The present disclosure is also based in part on the discovery that when diamine (e.g., piperazine) solutions are loaded with up to about 0.8 moles of carbon dioxide ($CO_2$) per mole of diamine, the volatility of the diamine may be further reduced. Such a reduction may occur at least in part because of the formation of carbamate ions. Such a reduction may result in the ability to produce concentrated solutions of diamine loaded with $CO_2$ which have a volatility acceptable for use in the methods of the present disclosure.

The present disclosure is also based in part on the discovery that the total solubility of solid diamine (e.g., piperazine) may be enhanced in solutions loaded with $CO_2$. In certain embodiments, the present disclosure provides solutions comprising up to about 10 m (moles diamine/kg water) total diamine when said solutions are loaded with about 0.8 moles $CO_2$ per mole of diamine. This increase in solubility may be due in part to the formation of carbamate ions.

The present disclosure is also based in part on the discovery that concentrated aqueous diamine (e.g., piperazine) may be more stable to oxidative and/or thermal degradation as compared to conventional solutions, such as MEA. In certain embodiments, the presence of dissolved iron may catalyze the degradation of MEA at a higher rate than the degradation of diamine. In certain embodiments, solutions of diamine loaded with $CO_2$ may not degrade significantly even at temperatures as high as 150° C., whereas MEA may undergo significant degradation (up to about 50%) at 120° C. Thus, in certain embodiments, the present disclosure provides solutions comprising a diamine which may be used advantageously at higher pressures and/or temperatures. For example, the solutions comprising a diamine may be used at temperatures less than 175° C. Such an ability to operate at higher pressures and/or temperatures may, among other things, reduce the amount of energy necessary to perform the methods of the present disclosure. In certain embodiments, such a reduction of the amount of energy may range from about 10% to about 30%. Additionally, solutions comprising diamine (e.g., piperazine) may absorb $CO_2$ at faster rates. In certain embodiments, the use of solutions comprising piperazine may result in increased in $CO_2$ absorption rates ranging from about 20% to about 100%. Such increased $CO_2$ absorption rates may, among other things, enable absorber configurations which require less packing and pressure drop.

When used in the methods of the present invention, the diamine (e.g., piperazine) may be recovered following absorption of $CO_2$. In certain embodiments, such recovery may occur through an evaporation process using a thermal reclaimer.

In certain embodiments, the present disclosure provides a method for the removal of acidic gases from a gas mixture comprising contacting the gas mixture with a solvent comprising a diamine (e.g., piperazine) in an amount of from about 4 to about 15 moles/kg of water and carbon dioxide in an amount of from about 0.3 to about 0.8 moles per mole of the diamine.

While the present disclosure primarily discusses removal of $CO_2$, any acidic gas capable of removal by the methods of the present invention is contemplated by the present disclosure. Such acidic gases may include, but are not limited to, hydrogen sulfide ($H_2S$) or carbonyl sulfide (COS), $CS_2$, and mercaptans.

The gas mixture may be any gas mixture comprising $CO_2$ for which $CO_2$ removal is desired and which is compatible with (i.e. will not be adversely affected by, or will not adversely react with) the methods of the present disclosure. In certain embodiments, the gas mixture may comprise any gas mixture produced as the byproduct of a chemical process. Suitable gas mixtures may comprise one or more of natural gas and hydrogen.

Process Configurations

In certain embodiments, the present disclosure provides several process configurations that may be useful in the methods of the present disclosure. The choice of process configuration may depend upon a number of factors, including, but not limited to, the composition of the gas mixture, the desired amount of $CO_2$ removal, the concentration of diamine (e.g., piperazine) to be used, and resource or environmental considerations.

One type of process configuration that may be useful in the methods of the present invention is a matrix stripper configuration. In certain embodiments, such a matrix stripper configuration may be a two-stage matrix, such as the configuration shown in FIG. 13. In such a two-stage matrix configuration, the temperature change across the stripper may be reduced without the inefficiencies that may be associated with mechanical compression. The rich solution from the absorber may be split into two streams. The first stream may be sent to the first stripper at a higher pressure, which may result in a slightly superheated feed. Heat may be applied via reboiler steam. The lean solution from the first column may be the semirich feed to the middle of the second column, which may operate at a lower pressure. The other rich stream may be fed to the top of the second stripper. The second column may produce a semilean stream and a lean stream. The semilean stream may be crossexchanged with the rich feed to the second column, while the lean solution may be crossexchanged with the rich solution to the first stripper. The water vapor from the overhead of the second column may be condensed, and the $CO_2$ may be sent to the first stage of the compression train. The water vapor in the overhead from the first column may be condensed, and the $CO_2$ may be sent to the second stage in the compression train. The compression work in this configuration may be reduced due at least in part to recovery of a portion of the $CO_2$ at a higher pressure, which may reduce the need for compression downstream. In certain embodiments, the lower pressure column may be set to 160 kPa for normal pressure operations. In certain embodiments, the lower pressure column may be set to 30 kPa for vacuum operations. The pressure of the higher-pressure column and the flow into the flash section may be optimized to minimize the total equivalent work of the system. Even though a two-stage matrix is described in the present disclosure, a three-stage matrix may also be used with reduced energy requirement.

Another type of process configuration that may be useful in the methods of the present invention is multistage flash stripper configuration. In certain embodiments, such multistage flash strippers may be configured as a multistage flash with a multistage intercooled compressor as illustrated in FIG. 37. Cold rich solvent from the absorber is heated by cross exchange with hot lean solution from the last stage. At stage n rich solution is heated then flashed to a lower pressure ($P_n$) to release $CO_2$ with some water vapor. The vapor from the flash tank is combined with vapor from the next stage (n+1), intercooled to condense water and compressed to the pressure ($P_{n-1}$) of the previous stage. Lean solution from the last stage is returned to the absorber through the cross exchanger. The process may be optimized to select a number of stages from 1 to 6, a pressure ratio ($P_n/P_{n+1}$) from stage to stage of 1.2 to 10, and a heat rate at each stage from 0 to 200 kJ/mol $CO_2$. The temperature of the flash tank may practically vary from 80 to 175° C. This configuration will be especially attractive with flash tank temperature from 120 to 150° C. when used with amines such as piperazine that do not degrade at the elevated temperature. The most attractive configuration with concentrated piperazine solution might use 3 stages, each at 140 to 150° C., with the about the same heat rate, and with approximately equal pressure ratios.

Another type of process configuration that may be useful in the methods of the present invention is an exchange stripper configuration. In certain embodiments, such an exchange stripper configuration may be an internal exchange stripper, such as the configuration shown in FIG. 14. Among other things, this configuration integrates the stripping process with heat transfer. In certain embodiments, this configuration may approach the theoretical limit of adding and removing material and energy streams along the entire column. Similar configurations have been described previously by Leites et al. and Mitsubishi. In certain embodiments, this configuration may alleviate the temperature drop across the stripper by exchanging the hot lean solution with the solution in the stripper. In certain embodiments, the configuration may comprise a continuous heat exchange surface, which may allow for countercurrent heat exchange of the hot-lean solution with the solution passing through the stripper. In certain embodiments, a large overall heat transfer capability of 41.84 W/K-mol solvent per segment may be used. Such a heat transfer capability may result in a typical $\Delta T$ of about 1.2 K and about 3 K in the internal exchanger for the vacuum operation, and for operation at normal pressure, respectively.

Another type of process configuration that may be useful in the methods of the present invention is a multipressure configuration. In certain embodiments, such a multipressure configuration may be a multipressure configuration with a split feed, such as the configuration shown in FIG. 15. Similar multipressure configurations have been described in our previous work. In certain embodiments, this configuration may take a 10% split feed from the liquid flowing from the middle to the lowest pressure level in a multipressure stripper, and it may send this stream to an appropriate point in the absorber. In certain embodiments, the temperatures at the bottom of the stripper pressure sections may be equal, and heat may be added to each stripper pressure section to achieve isothermal operation in each section. Such operating conditions, among other things, may reduce irreversibilities and work loss. Among other things, this configuration may take advantage of the favorable characteristics of the multipressure configuration and the split flow configurations. In certain embodiments, the middle pressure may be configured to be approximately the geometric mean of the top pressure and the bottom pressure.

Another type of process configuration that may be useful in the methods of the present invention is a flashing feed configuration. An example of such a configuration is shown in FIG. 16. In certain embodiments, this configuration may comprise special configurations of the split flow concept described by Leites et al. and Aroonwilas. In certain embodiments, at least a fraction of the rich stream may be sent to the middle of the stripper, where, after stripping, a lean solution may exit at the bottom. The rich solution may be crossexchanged with the lean solution exiting the stripper bottom.

In certain embodiments, the vapor leaving the stripper may then be contacted with the absorber rich flow in a five-staged upper section where the latent heat of water vapor may be used to strip the $CO_2$ in the 'cold feed' and a semilean stream may be produced. In certain embodiments, the semilean product may be cross-exchanged with the rich solution fed to the upper section. In certain embodiments, the reboiler duty may remain substantially unchanged, and 'free stripping' may be achieved in the upper section. In certain embodiments, the split ratio of the rich streams into the middle and upper sections may be optimized to minimize equivalent work.

The choice of operating conditions for each of these process configurations may depend upon a number of factors, including, but not limited to, the composition of the gas mixture, the desired amount of $CO_2$ removal, the concentration of piperazine to be used, and resource or environmental considerations. Examples of suitable operating conditions are shown in FIGS. 6, 12, 13 and 14 for the double matrix, internal exchange, multipressure with split feed, and flashing feed stripper configurations, respectively.

Therefore, the present invention is well adapted to attain the ends and advantages mentioned as well as those that are inherent therein. While numerous changes may be made by those skilled in the art, such changes are encompassed within the spirit of this invention as illustrated, in part, by the appended claims.

EXAMPLES

Figure 1:
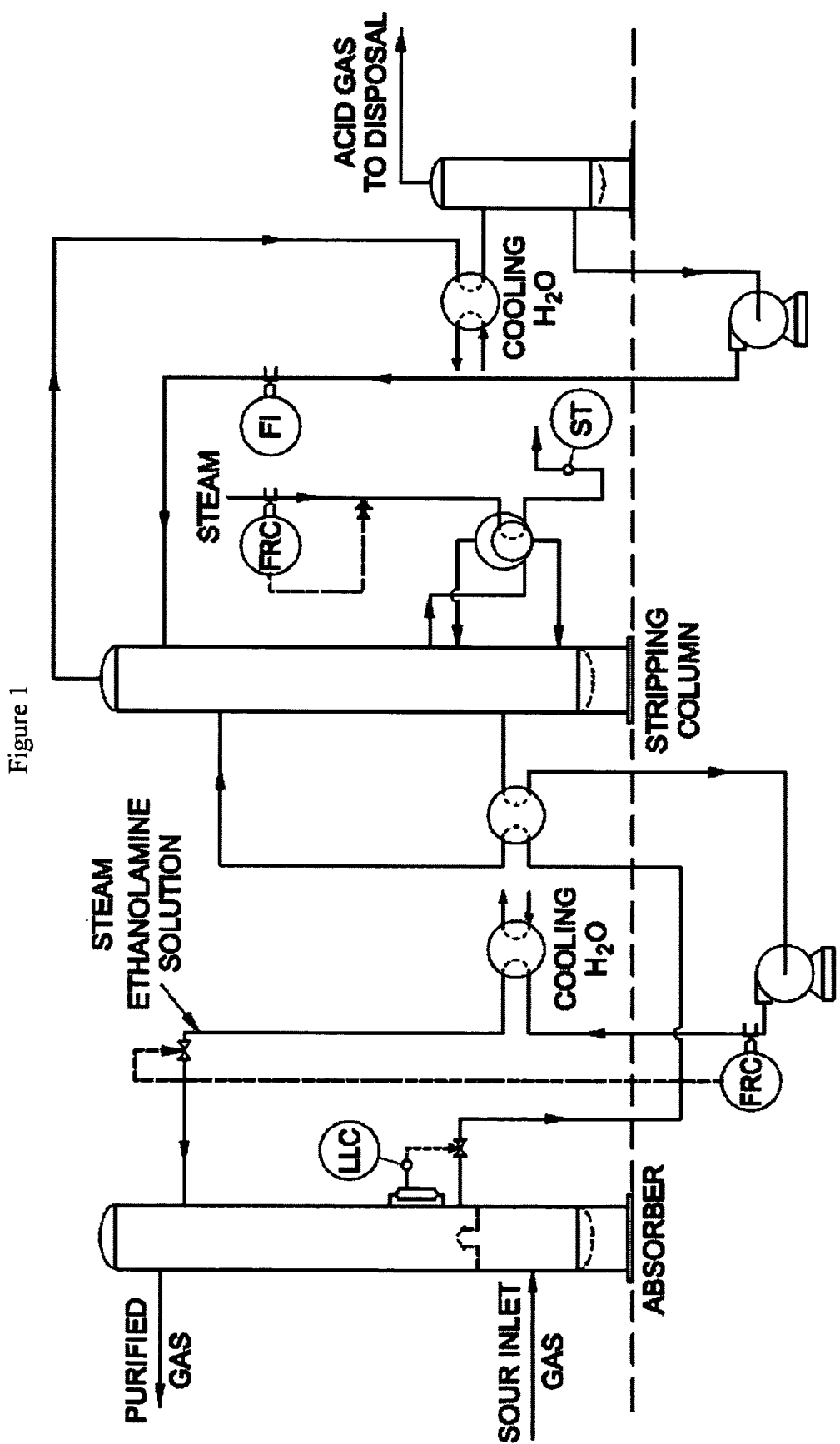
FIG. 1 shows a typical flowsheet for aqueous amine absorption/stripping for $CO_2$ removal.
Figure 2:
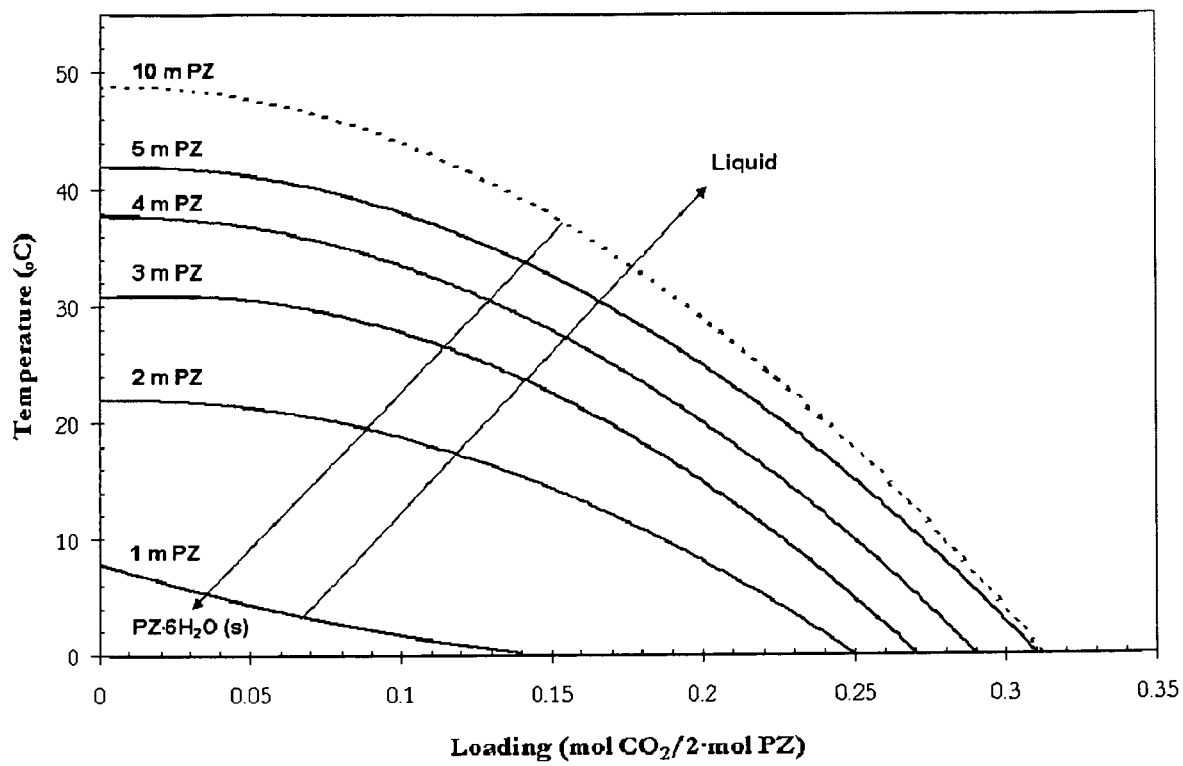
FIG. 2 shows the predicted Solubility of $PZ.6H_2O$ in solutions of PZ in water loaded with $CO_2$.

Solubility of piperazine ($PZ.6H_2O$) solid in PZ solvents. The solubility of $PZ.6H_2O$ in water was measured by differential scanning calorimetry. The vapor pressure of PZ and $CO_2$ was measured over loaded and unloaded solutions of piperazine from 30 to 60° C. These data were combined with other thermodynamic data on $PZ/CO_2/H_2O$ and regressed with the electrolyte/NRTL model in AspenPlus. FIG. 2 gives the predicted solubility of $PZ.6H_2O$ in loaded PZ solvent as a function of T. 5-10 m PZ solvents can be prepared at loading greater than 0.25 moles $CO_2$/equivalent PZ without precipitating $PZ.6H_2O$ at ambient T. At 0° C. solutions up to 4.5 m PZ can be prepared at a loading of 0.3 moles $CO_2$ per mole of PZ.

Loaded solutions of piperazine were prepared by mixing and heating anhydrous piperazine and water, then sparging with $CO_2$ on a balance. Table 1 shows that solutions with loading less than 0.3 and greater than 0.4 usually precipitate solids when cooled to ambient temperature. The solids precipitated at greater loading were identified as hydrated, protonated piperazine carbamate ($CO_2$·piperazine·$H_2O$).

TABLE 1

| PZ (m) | $CO_2$ ldg (moles/2molePZ) | Observation at ambient T |
|---|---|---|
| 10 | 0.3 | Clear |
| 10 | 0.4 | Clear |
| 15 | 0.3 | Clear |
| 20 | 0.3 | Clear |
| 8 | 0.4+ | Solids formed, identified as $H_2O$•PZ•CO2 |
| 8 | 0.3 | Clear |
| 8 | 0.1 | Solid block |
| 8 | 0.4 | Clear |
| 10 | 0.425 | Precipitates |
| 8 | 0.2 | precipitates |

Figure 3:
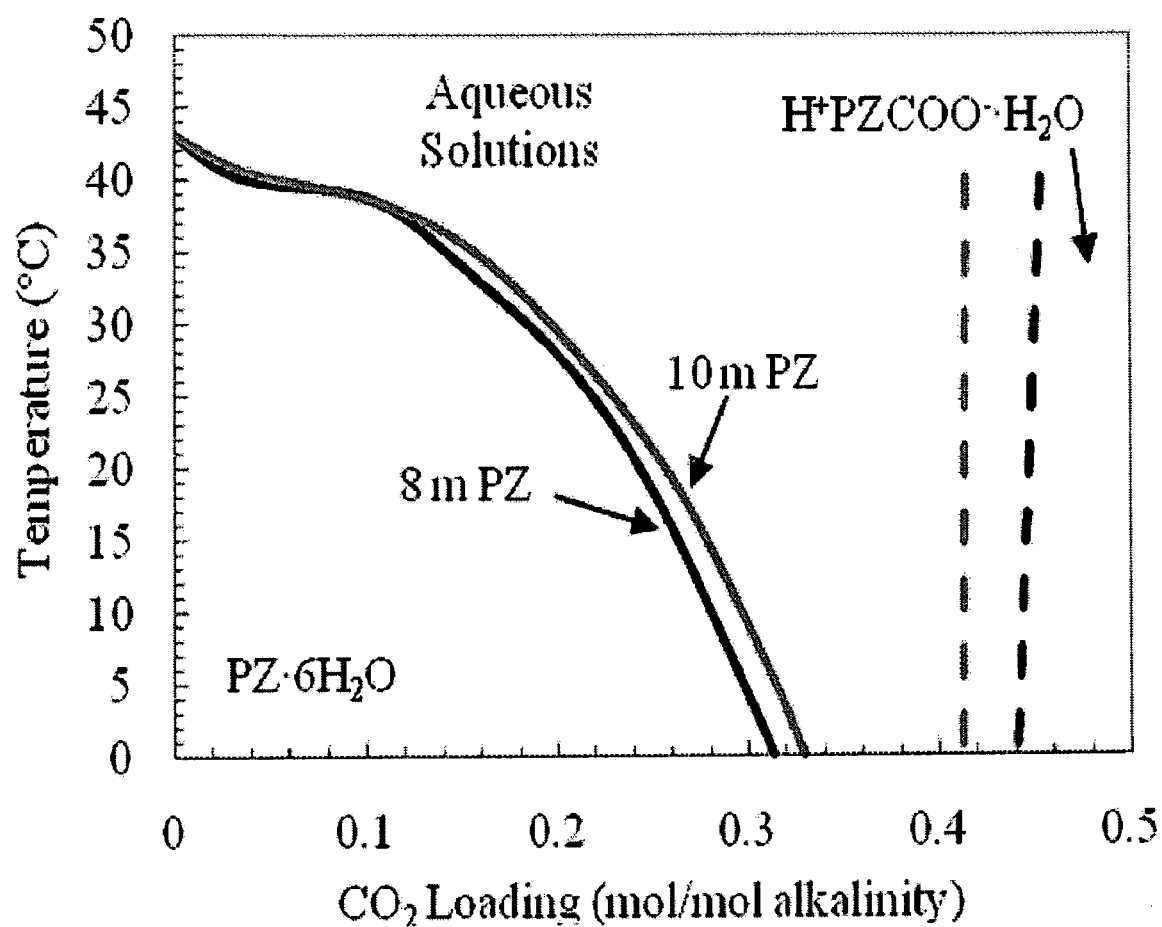
FIG. 3 shows a plot of the Solid-Liquid transition temperatures for PZ solutions.
Figure 4:
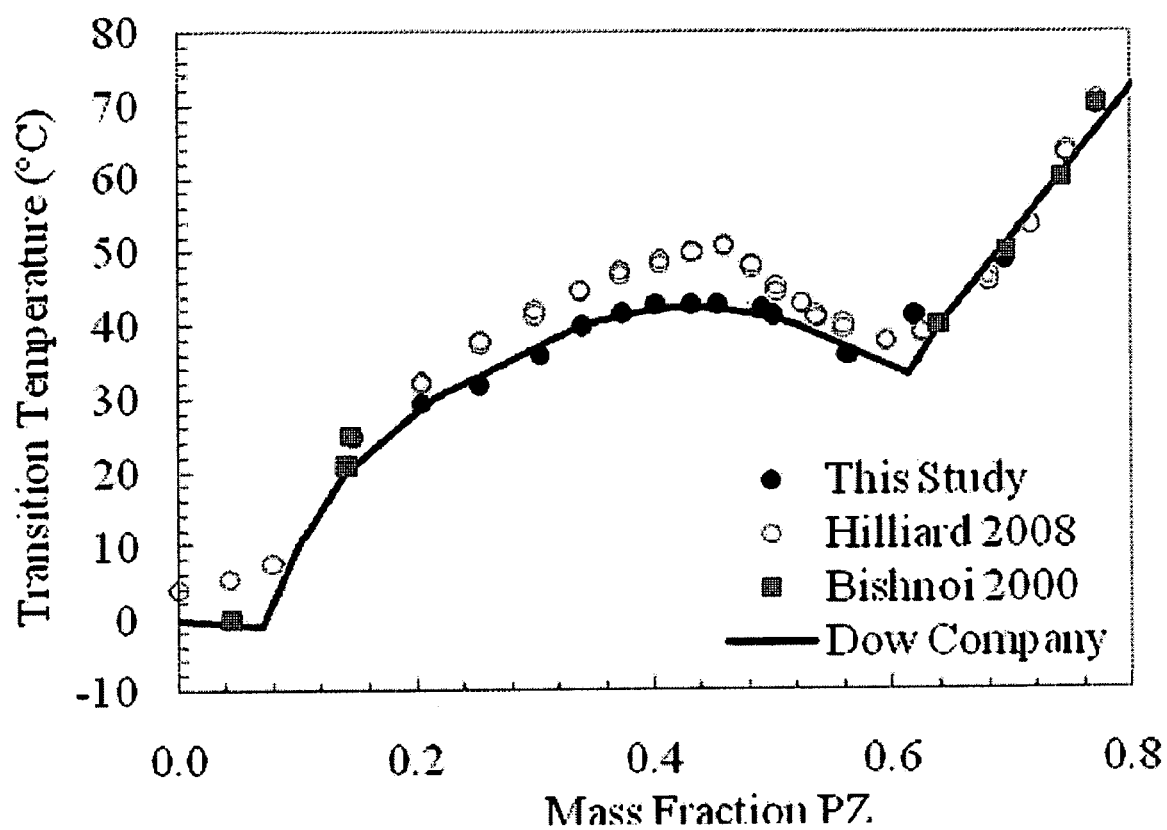
FIG. 4 shows a plot comparison of solid solubility for aqueous PZ.

The solid solubility of PZ was studied over a range of PZ concentration, $CO_2$ loading, and temperature. Solutions were prepared to cover the desired solution properties and were allowed to equilibrate at each condition with stirring before solubility observations were made. The transition temperature of 8 and 10 m PZ solutions over a range of $CO_2$ loading is shown in FIG. 3. The transition temperature is the temperature at which a liquid solution will first precipitate when cooled slowly. The approximate temperature ramp for all transitions was 1° C. every 5 minutes. The two dashed lines at rich loadings in FIG. 3 represent soluble PZ solutions indicating that the solubility envelope extends at least this far. The transition temperature of unloaded PZ solutions ranging from 1.0 to 40 m PZ is shown in FIG. 4.

Figure 5:
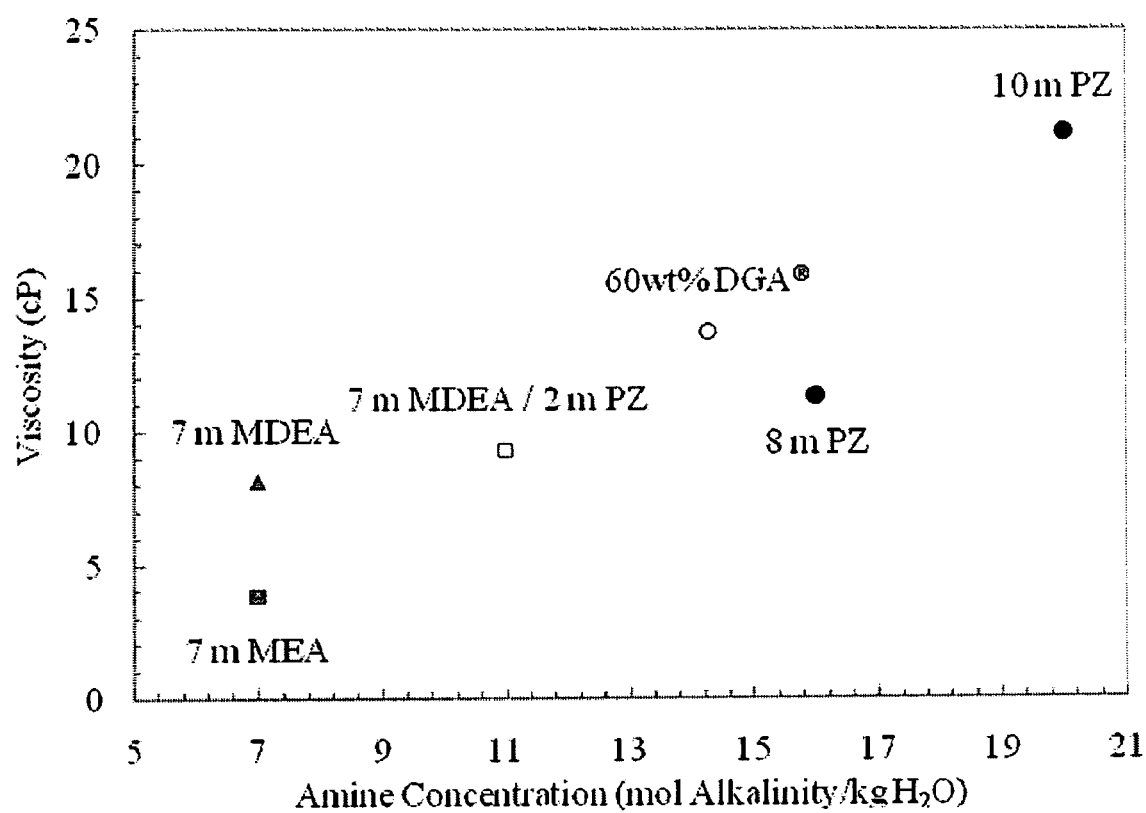
FIG. 5 shows a plot of the viscosity of amine solutions at typical rich loading, 40° C.

Viscosity. The viscosity of aqueous PZ solutions has been measured from 0.20 to 0.45 moles $CO_2$/mole alkalinity, 2 m PZ to 20 m PZ, and 25° C. to 60° C. The viscosity of 8 and 10 m PZ is compared with other amines in FIG. 5. The amine concentration is plotted in units of moles alkalinity per kg of water in order to compare mono- and diamines on the same basis. All of the viscosities are at 40° C. and at the rich loading of the system (0.3 mol $CO_2$/equiv Amine for MDEA and MDEA/PZ; 0.4 mol $CO_2$/equiv Amine for PZ and DGA; 0.5 mol $CO_2$/equiv Amine for MEA).

Comparison of the viscosity on this basis shows how the amine basic groups affect overall viscosity. As the concentration of basic groups increases, the viscosity increases in a linear direction. The viscosity of 8 m PZ is higher than that of 7 m MEA, but as compared to 60 wt % DGA®, the viscosity of PZ is lower for a higher alkalinity. DGA® solutions at 60 wt % are successfully used in natural gas treating.

Oxidative Degradation. Heavy metals are known to catalyze the oxidative degradation of amines. The results of oxidative degradation of concentrated PZ in the presence of several dissolved metals are shown in Table 2. The experiments simulated four scenarios: (1) leaching of stainless steel metals, (2) addition of a copper-based corrosion inhibitor, (3) addition of a vanadium-based corrosion inhibitor (low concentration), and (4) addition of a copper-based corrosion inhibitor and proprietary inhibitor "A".

TABLE 2

| Case | Solution (m) | Heavy Metals (mM) | Rate of Formation (mM/hr) | | | |
|---|---|---|---|---|---|---|
| | | | Formate | Formamide | EDA | Amine |
| — | 7 MEA | 1.0 Fe | 0.29 | 0.35 | — | −3.8 |
| 1 | 10 PZ | 0.6 $Fe^{2+}$, 0.25 $Cr^{3+}$, 0.25 $Ni^{2+}$ | 0.005 | 0.007 | 0 | −1.1 |
| 2 | 10 PZ | 4.0 $Cu^{2+}$ | 0.14 | 0.24 | 0.43 | −3.0 |
| 3 | 8 PZ | 0.1 $Fe^{2+}$, 0.1 $V^{4+}$ | 0.006 | 0.013 | 0 | −0.8 |
| 4 | 8 PZ | 4.0 $Cu^{2+}$, 0.1 $Fe^{2+}$, 100 "A" | 0.011 | 0.016 | 0.009 | −1.1 |

Oxidative degradation of concentrated PZ was found to be four times slower than that of MEA in the presence of stainless steel metals ($Fe^{2+}$, $Cr^{3+}$, and $Ni^{2+}$) and a low concentration of vanadium. As with MEA solutions, PZ was determined to be highly susceptible to oxidative degradation in the presence of $Cu^{2+}$. The primary degradation products were found to be ethylenediamine (EDA), formate, oxalate, and N-formylpiperazine, the amide of formate and PZ (denoted as Formamide in the table). The N-formylpiperazine concentration was not measured directly, but inferred from formate production through the basic reversal of the N-formylpiperazine formation reaction. Also, as with MEA, Inhibitor "A" was able to vastly reduce this degradation to levels comparable with the stainless steel and vanadium cases.

Thermal Degradation. Thermal degradation was investigated in PZ solutions at slightly above stripper temperature (135° C.) and much higher than stripper temperatures (150° C. and 175° C.). The thermal degradation results are shown in Table 3. Experiments ranged from 4 to 12 weeks in length.

TABLE 3

| Solvent | $CO_2$ Loading (mol/mol alkalinity) | Temp. (° C.) | Amine Loss (% per week) |
|---|---|---|---|
| 7 m MEA | 0.4 | 135 | 5.3% |
| 10 m PZ | 0.3 | 135 | 0.25% |
| 7 m MEA | 0.4 | 150 | 11% |
| 10 m PZ | 0.3 | 150 | 0.8% |
| 8 m PZ | 0.3 | 175 | 8.0% |

PZ thermal degradation was determined to be negligible at 135 and 150° C. as compared to 7 m MEA. At 175° C., 32% of the PZ was degraded in 4 weeks. EDA was observed as a thermal degradation product at 175° C. but not at lower temperatures. Addition of 5.0 mM $Cu^{2+}$/0.1 mM $Fe^{2+}$, 5.0 mM $Cu^{2+}$/0.1 mM $Fe^{2+}$/100 mM Inhibitor "A", and 0.6 mM $Cr^{3+}$/0.25 mM $Fe^{2+}$/0.25 mM $Ni^{2+}$ did not affect degradation rates at 175° C.

Figure 6:
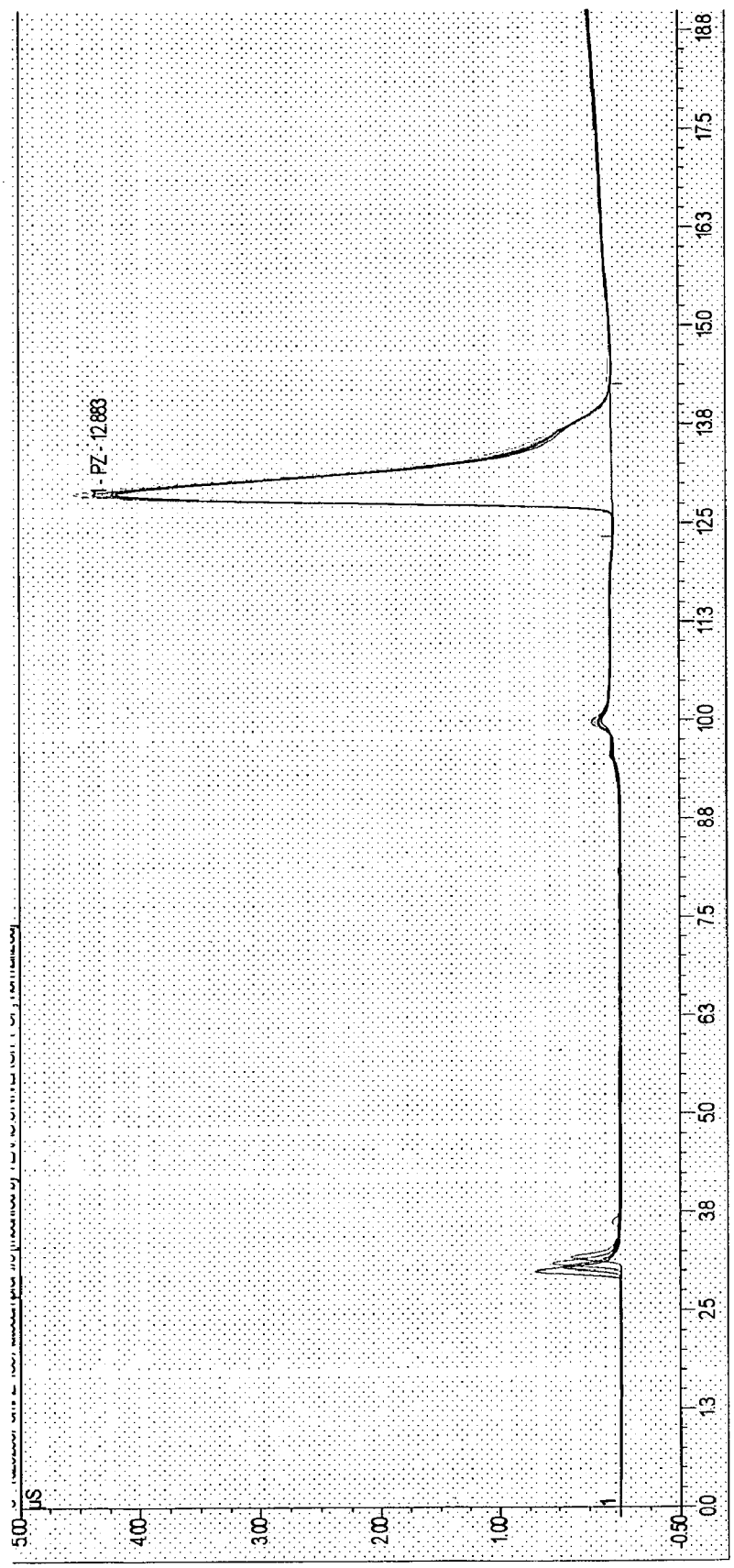
FIG. 6 shows overlayed cation IC chromatograms of 5 m PZ after 0, 1, 2, 4, 6 and 8 weeks at 135° C.

The amine concentration was determined by cation chromatography. FIG. 6 shows that piperazine solutions with a loading of 0.4 moles $CO_2$/mole alkalinity are thermally stable for up to 8 weeks at 135° C. This is in contrast to loaded solutions of MEA that lose up to 30% of the MEA at the same conditions.

Figure 7:
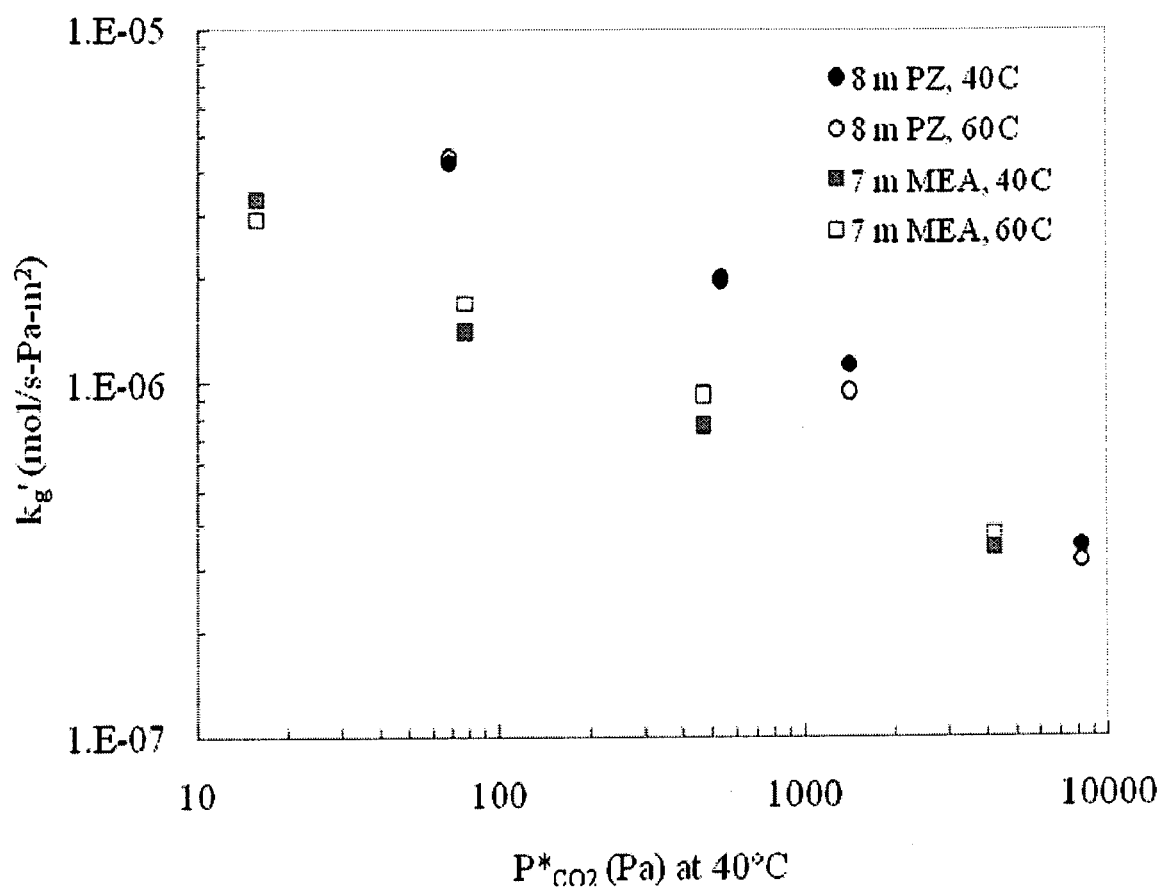
FIG. 7 shows a plot of $CO_2$ solubility in aqueous PZ solutions.

$CO_2$ Solubility. The measured solubility of $CO_2$ in 2 m to 8 m PZ solutions is in given in FIG. 7 and compared to previous studies. The $CO_2$ solubility of concentrated, aqueous PZ solutions follows the trends found previously for lower concentration PZ solutions at 40 and 60° C. $CO_2$ solubility is known to not be a strong function of amine concentration and this is confirmed for high concentration PZ solutions. At 40° C., 8 m PZ provides a working capacity of 0.73 moles/kg (PZ+$H_2O$), which is calculated based on a change in the equilibrium $CO_2$ partial pressure from 7.5 kPa (loading of 0.415 mol $CO_2$/mol alkalinity) to 0.75 kPa (0.33 mol $CO_2$/mol alkalinity). For 7 m MEA at 40° C., the working capacity is 0.43 moles $CO_2$/kg (MEA+$H_2O$) based on a change in the equilibrium partial pressure of $CO_2$ from 5 kPa (0.53 mol $CO_2$/mol alkalinity) to 0.5 kPa (0.45 mol $CO_2$/mol alkalinity). The selected range of $CO_2$ loading for the 8 m PZ solution falls within the solubility envelope established in FIGS. 3 and 4.

Kinetics of $CO_2$ Absorption in PZ Solutions. The kinetics of the $CO_2$ absorption into concentrated aqueous PZ was studied in a wetted wall column. The measured liquid-side mass transfer coefficient based on a gas side driving force, $k_g'$, is shown compared to 7 m MEA in FIG. 8 for 40° C. and 60° C. Data at 60° C. are plotted versus the equilibrium partial pressure of $CO_2$ if the solution were at 40° C. for comparison purposes.

As demonstrated in FIG. 8, the normalized flux, $k_g'$, for 8 m PZ is 2 to 3 times greater than for 7 m MEA. For example, at 40° C. and an equilibrium $CO_2$ partial pressure of 500 Pa, the $k_g'$ for 8 m PZ and 7 m MEA are $1.98 \times 10^{-6}$ and $7.66 \times 10^{-7}$ mol/s-Pa-$m^2$, respectively. This demonstrates that the kinetic rate of concentrated PZ is over twice as fast as MEA at 40° C. The same trend is observed for the data at 60° C.

Volatility of PZ Solutions. The volatility of PZ was measured in the equilibrium cell with hot gas FTIR. The volatility of 8 m PZ solutions is compared to that of 5 m PZ and 7 m MEA in FIG. 9. The volatility of each solution is normalized by the PZ concentration for comparison purposes.

At 40° C., the normalized volatility of PZ solutions is the same as the normalized volatility of MEA solutions. It was anticipated that PZ would have a higher volatility than MEA because the boiling point of PZ, 146° C., is lower than that of MEA, 170° C. However, the volatility of PZ is comparable at 40° C. Initial modeling of PZ systems demonstrates this effect as a greatly reduced activity coefficient for PZ. At 40° C., PZ volatility varies from 10 to 19 ppm at atmospheric pressure.

Cullinane (2005) estimated PZ volatility over lean solutions (FIG. 11). At 60° C., with an equilibrium $CO_2$ partial pressure of 1000 Pa, he estimates a volatility of 20 e-6 atm with 1.8 m PZ. If his estimate is extrapolated to 9 m PZ, the estimated volatility would be about 90 ppm. However, the measured vapor pressure of piperazine is given in FIG. 12. At 40° C. with 9 m PZ and an equilibrium $CO_2$ partial pressure of 1000 Pa, the volatility of piperazine is only 45 ppm. At lower loading the measured volatility of 9 m PZ would asymptote at 81 e-6 atm. Therefore the volatility is reduced significantly by operation at a reasonable loading for lean solution.

Kohl and Nielsen (1997) note that "$CO_2$ stripping from MEA solution increases with increased reboiler pressure." Elevated stripper pressure/temperature has also been identified as a useful operating condition to minimize total energy requirement (PCT/US2004/019838). This effect results from temperature swing desorption, because the heat of $CO_2$ desorption is greater that the heat of $H_2O$ evaporation, less heat is required to strip $CO_2$ at greater stripper temperature. This is especially true with solvents that have a greater heat of $CO_2$ desorption.

The heat of $CO_2$ desorption was estimated by the rigorous thermodynamic model based on data with 2.4 m PZ. Some results are given in Table 4.

TABLE 4

| T (° C.) | $CO_2$ loading (moles/2molePZ) | $-\Delta H_{abs}$ (kJ/gmol $CO_2$) |
|---|---|---|
| 40 | 0.3 | 68 |
| 120 | 0.3 | 95 |
| 40 | 0.45 | 50 |
| 120 | 0.45 | 75 |

In PZ solutions the heat of $CO_2$ desorption is always greater than that of water, which is about 40 kJ/gmol. Therefore, it may be advantageous to operate the stripper at greater temperature. Because PZ does not degrade very fast, even at greater temperature it should be possible to operate the stripper as hot as 135 to 160° C., giving improved energy performance.

Estimated Energy Requirement. Thermodynamic models for MEA and PZ were developed by Hilliard, and the PZ model was modified for concentrated solutions. The stripper section of an absorber/stripper system for $CO_2$ removal was simulated for 8 m PZ and compared with 7 m MEA. These simulations included a simple stripper with $CO_2$ compression to 5 MPa, a 5° C. cold side temperature approach for the cross heat exchanger, and a 10° C. approach for the reboiler. For all cases, 15 m of CMR NO-2P packing was used with an 80% approach to flood. The rich stream for each case assumed a $P^*_{CO2}$ at the absorber temperature of 40° C. One PZ case assumed a higher $P^*_{CO2}$ due to the faster rates of PZ expected in the absorber.

Each system was simulated at their optimum lean loadings and the baseline system, 7 m MEA, had an equivalent work of 36.1 kJ/mol $CO_2$. The two 8 m PZ systems modeled at a 5.0 or 7.5 kPa rich equilibrium $CO_2$ partial pressure had minimum equivalent works of 33.5 kJ/mol $CO_2$ and 32.6 kJ/mol $CO_2$, respectively. The PZ system with the lower rich $P^*_{CO2}$, 5 kPa, was less efficient than the system with 7.5 kPa $P^*_{CO2}$, but was better than the 7 m MEA case with an equivalent rich loading. The increased capacity of PZ improved its performance over the baseline, despite a lower $\Delta H_{abs}$.

Testing of Process Configurations.

Model Development. An equilibrium stripper model for aqueous solvents developed in Aspen Custom Modeler (ACM) was used to evaluate the different process configurations and solvents. A rich end pinch is usually predicted because of the generous amount of contacting assumed in the model. The stripper consisted of a flash region, 10 segments with 40% Murphree efficiency assigned to CO2, and a reboiler with 100% CO2 efficiency. The flash region in the column was quantified in terms of actual section performance.

Modeling Assumptions. The following modeling assumptions were made:

The sections are well mixed in the liquid and vapor phases.
The reboiler is in vapor/liquid equilibrium.
There is negligible vaporization of the amine.
The CO2 vapor pressure (kPa) under stripper conditions for 7 m MEA, promoted MEA and different $PZ/K_2CO_3$ blends is represented by the empirical expression in FIG. 21. The adjustable constants in FIG. 21 for the $PZ/K_2CO_3$ solutions were obtained by regressing points from the rigorous thermodynamic model by Cullinane. The constants for the MEA solvents were regressed from points obtained from equilibrium flashes in AspenPlus using the electrolyte non random two liquid (E-NRTL) model developed by Freguia from data of Jou et al.

The $CO_2$ vapor pressure over 4.28M MDEA and KS-1 (a proprietary solvent described by Mimura et al., based on the model by Posey et al. is shown in FIG. 22. For 4.28M MDEA, the constants in FIG. 22 are taken from Posey et al. For KS-1 the constant, A, was set at 32.45, while constants B-D, in the equilibrium constant expression were adjusted to fit available data. The amine mole fraction shown in FIG. 22 for KS-1 is set at 0.1313. The fit of the KS-1 data is shown in FIG. 23. The $CO_2$ solubility in the different solvents at 313 K is shown in FIG. 24. The heat of desorption was calculated by differentiating the following equation (also shown in FIG. 21) with respect to 1/T: where $\Delta H$ is the heat of desorption, R is the universal gas constant, T is the temperature in K, c is the $CO_2$ loading, and c, d, e, f are empirical constants.

$$-\frac{\Delta H}{R} = c + 2d\frac{\gamma^2}{T} + 2e\frac{\gamma}{T} + (f\gamma)$$

The heat of desorption for 4.28M MDEA and KS-1 was assumed to be constant at 62 and 73 kJ/gmol $CO_2$, respectively. The heat of vaporization of water, partial pressure of water, and heat capacities of solvent (assumed to be water), steam, and $CO_2$ were calculated with equations from the DIPPR database as described by Fisher et al. The molar heat capacities for the $CO_2$, water and amine were assumed to be equal and set to that of one mole of water.

FIG. 23 gives calculated values of the heat of $CO_2$ desorption with rich and lean loading at absorber (40° C.) and stripper (100° C.) conditions. The greatest variation of the heat of desorption (30 to 62 kJ/gmol) occurs with 6.4 m K+/1.6 m PZ. The variations of the heat of desorption with loading and temperature is not always in the expected direction with loading and temperature, but it is thermodynamically consistent with the representation of the VLE for these solvents. The average heat of desorption probably represents its effect on the VLE and the amount of stripping vapor required. The value at the stripper conditions probably represents its effect on the reboiler duty required to reverse the reaction.

The partial pressure of CO2 and water in each section was calculated by the following equation:

$$P_n = E_{mv}(P_n^* - P_{n-1}) + P_{n-1}$$

A Murphree efficiency ($E_{mv}$) of 40 and 100% was assigned to $CO_2$ and water. The model assumed that temperature equilibrium is achieved in each section.

The model inputs were the rich loading and liquid rate, the temperature approach on the hot side of the cross exchanger (difference between the temperature of the rich stripper feed and the lean solution leaving the bottom of the stripper), and column pressure. Initial guesses of the lean loading, section temperatures, partial pressures, and loading were provided. The model solves equations for calculating VLE, and for material and energy balances. It calculates temperature and composition profiles, reboiler duty, and equivalent work.

The total energy required by the stripper is given as total equivalent work:

$$W_{eq} = 0.75Q\left[\frac{(T_{reb}+10)-313}{(T_{reb}+10)}\right] + W_{comp}$$

$W_{comp}$ constitutes the isentropic work of compression to 330 kPa of the gas exiting the top of the stripper. An efficiency of 75% was assumed for the compressor. For the vacuum operations, five compressor stages were used, while for the normal pressure cases, three compressor stages were used. Two stages of compression were used to get to the maximum pressure of the process and an additional stage to 330 kPa with intercooling to 313 K between compressor stages.

The work lost by extracting steam from the power plant, which would have been used to drive turbines to generate electricity, is the first term on the righthand side of the equation in the previous paragraph, while the second is the compressor work. The condensing temperature of the steam is assumed to be 10 K higher than the reboiler fluid. The turbine assumes condensing steam at 313 K, and has been assigned an effective efficiency of 75%.

FIG. 25 gives the performance (stripping and compression work to 330 kPa) of the stripper configurations investigated, and the capacities of the solvents to achieve 90% $CO_2$ removal. The rich P_$CO_2$ shown in the table are approximate rich partial pressures expected for the solvents investigated. 4 m K+/4 m PZ, MEA/PZ, and MDEA/PZ are assigned greater rich $P_{CO2}$, because they are solvents with faster rates of reaction with CO2, which should result in richer solutions with a fixed absorber size. The values of $P\_CO_2$ (5 and 7.5 kPA) result in unexpectedly high rich loading with the MEA solvents. This absorber performance may require the use of more complex absorber designs with intercooling and increased packing height and surface area.

In this example, the lean loading for each configuration was optimized to minimize equivalent work. The optimum lean loading, the lean loading that minimized equivalent work, was quite flat for cases with $\Delta T=5$ K, and was approximately that for 90% change in equilibrium partial pressure of $CO_2$ from the absorber rich end to the absorber lean end at 313 K. The cases with an approach temperature of 10 K frequently resulted in greater that 90% change in equilibrium partial pressure (overstripping) from the absorber rich to lean ends.

In all of the cases with a 5 K approach temperature, the optimum lean loading was quite high. The heat of absorption shown in FIG. 25 is the average value from FIG. 24. The capacity of the solution is given by:

$$\text{capacity}\left(\frac{\text{mol } CO_2}{\text{kg } H_2O}\right) = (\gamma_{rich} - \gamma_{lean})\frac{\text{mol Alk}}{\text{kg } H_2O}$$

Effect of Varying Temperature Approach. The 'baseline' configuration for each system given in FIG. 25 is a simple stripper operating at 160 kPa, with a 10 K approach on the hot side of the cross exchanger. FIG. 25 also gives the energy requirement for an 'improved baseline' with a 5 K approach. The lean loadings for the baseline ($\Delta T=10$ K) were optimized, and frequently resulted in overstripping which increases the capacity of the solvents for absorption. With a 5 K approach on the hot side of the cross exchanger, 3 and 12% reduction in equivalent work was obtained for the 6.4 m K1/1.6 m PZ and 7 m MEA solvents, respectively, relative to the baseline case with a 5 K approach with these solvents. This savings in energy would be at the expense of a larger investment in heat exchange surface.

Effect of Operating Pressure. Operating the stripper atrocuum (30 kPa), with a 5 K temperature approach in the cross exchanger, offers a 14% reduction in equivalent work for 6.4 m K1/1.6 m PZ and 4 and 20% more energy with 5 m $K_1$/2.5 m PZ and MEA/PZ, respectively. This shows that vacuum operation favors solvents with low heats of absorption, while operation at normal pressure favors solvents with high heats of absorption. This effect was also confirmed in the results with a generic solvent, reported in the next section. Solvents with high heats of absorption take advantage of the temperature swing. The relative vapor pressure of $CO_2$ and water changes with temperature. This change is greater with solvents with high heats of absorption as shown in FIG. 26.

The reboiler duty required for stripping can be approximated as the sum of three terms: the heat required to desorb the $CO_2$, that required to generate the water vapor at the top of the column, and the sensible heat requirement, as shown by the following equation:

$$Q = Q_{des} + Q_{H_2O\,gen.} + Q_{sens}$$

$$= \Delta H_{des} + \left(\frac{n_{H_2O}}{n_{CO_2}}H_{vap}\right) + \left(\frac{LCp\Delta T}{n_{CO_2}}\right)$$

FIG. 21 shows the contributions to the reboiler duty for 6.4 m K+/1.6 m PZ and MEA/PZ. The major difference between the reboiler duties is the relative amount of the heat of desorption of $CO_2$, and the heat required to generate the water vapor at the top of the stripper. It is more attractive to strip 6.4 m K+/1.6 m PZ at 30 kPa than at 160 kPa. Normal pressure favors solvents with high heats of desorption, such as MEA/PZ.

Generic solvent modeling. The following three-parameter expression for the vapor-liquid equilibrium was used to model generic solvents:

$$\ln P = a + b^* \mathrm{ldg} \cdot \frac{\Delta H}{RT}$$

The constant b was set to 24.76, while the constant a was varied. The value of the constant a, used in the above equation for the generic solvents is shown in FIG. 27. FIG. 28 shows the minimum total equivalent work for the generic solvents at 160 kPa and 30 kPa with a 5° C. approach on the hot side of the cross exchanger.

The results show that at 160 kPa, the optimum generic solvent is one with a heat of absorption of 126 kJ/gmol $CO_2$ which is greater than 7 m MEA (80-100 kJ/gmol $CO_2$). At 30 kPa, the optimum generic solvent is one with a heat of absorption 80 kJ/gmol $CO_2$ (about that of 7 m MEA). For solvents with $\Delta H_{abs}$<60 kJ/gmol $CO_2$, stripping at 30 kPa is more attractive than stripping at 160 kPa. FIG. 24 shows the reboiler duty for the generic solvents at 160 kPa and 30 kPa. The reboiler duty is minimized at 80 kJ/gmol $CO_2$ at 160 kPa and 63 kJ/gmol $CO_2$ at 30 kPa. FIG. 29 shows that for solvents with $\Delta H_{abs}$<40 kJ/gmol $CO_2$, stripping at 30 kPa may be more attractive than stripping at 160 kPa in operations where energy use is not critical for example in natural gas processing.

Predicted Performance of Alternative Configurations. FIG. 25 shows that the multipressure configuration with a 160 kPa reboiler is more attractive for the solvents with a high heat of absorption than solvents with a lower heat of absorption. The performance of the alternative configurations is matrix>internal exchange>multipressure with split feed>flashing feed. The matrix and internal exchange configurations with a 160 kPa reboiler and 5 K approach with 7 m MEA offer 9 and 11% energy savings, respectively, over the simple stripper operated at 160 kPa with a 5 K approach.

The characteristics of the matrix (265/160 kPa) and 160 kPa strippers for MEA are shown in FIG. 30. The matrix stripper recovers about 40% of the $CO_2$ at a higher pressure, and does not have the inefficiencies associated with the multipressure stripper. The reboiler duty is also slightly less for the matrix than the normal pressure stripper.

The characteristics of the vacuum, and the vacuum internal exchange strippers are in FIG. 26. The major difference between the two configurations is the difference in the ratio of the water vapor to $CO_2$ in the overhead stream. The internal exchange stripper has a smaller ratio of water vapor to $CO_2$. Multipressure with split feed reduces the flow into the bottom section of the stripper, and, thus, equivalent work. The flashing feed makes use of the latent heat of water vapor in the simple/vacuum configuration to strip some $CO_2$ in the rich stream entering the stripper at the top of the column.

Solvent Performance. FIG. 25 shows the performance of the different solvent types. The results show that at 160 kPa, MEA/PZ, MDEA/PZ, and KS-1 require significantly less equivalent work than 7 m MEA. MEA/PZ offers a 13 and 8% savings over 7 m MEA with the matrix and internal exchange configurations at 160 kPa. MDEA/PZ was the most attractive solvent in vacuo conditions. MDEA/PZ offers a 14 and 10% savings over 7 m MEA, with the matrix and internal exchange configurations at 30 kPa. This shows that, at normal pressure, solvents with high heats of absorption and reasonable capacities are attractive. In vacuo conditions, solvents with lower heats of absorption and higher capacities are attractive. Capacity seems to play a more important role in determining energy requirements at vacuum conditions.

Effect of Heat of Absorption. From FIG. 25, solvents with similar capacities, but different heats of absorption can be compared. 6.4 m K+/1.6 m PZ and 5 m K+/2.5 m PZ are compared. The results show that at a fixed capacity, solvents with high heats of absorption require less energy for stripping. This is a consequence of the temperature swing. The 5 m K+/2.5 m PZ offers 18% savings over 6.4 m K+/1.6 m PZ at 160 kPa with a 5 K approach and savings of 3 and 4%, with the matrix and internal exchange configurations at vacuum conditions.

Effect of Capacity and Mass-Transfer Rates. The capacity of a solvent is defined as the amount of $CO_2$ a solvent can absorb over a given range of loading or partial pressure. This reflects the vapor-liquid equilibrium characteristics of a solvent. A high-capacity solvent can absorb or desorb more $CO_2$ than one with a low-capacity. Some solvents can also achieve richer loading because they have greater rates of $CO_2$ absorption.

In FIG. 25, 5 m K+/2.5 m PZ and MDEA/PZ have similar heats of absorption. However, MDEA/PZ has a greater capacity, and is also assumed to achieve greater equivalent rich loading than 5 m K+/2.5 m PZ. Therefore, MDEA/PZ provides 30 and 19% energy savings over 5 m K+/2.5 m PZ, with the matrix and internal exchange configurations with the reboiler operating at 160 kPa and 17 and 12% savings with these configurations at 30 kPa.

The two MEA solvents also have similar heats of absorption. MEA/PZ represented by 11.4 m MEA has a higher capacity and rich loading than 7 m MEA. MEA/PZ offers 13% energy savings over 7 m MEA, with the matrix stripper operated with a 160 kPa reboiler temperature.

On the other hand, KS-1 is never quite as good as MDEA/PZ, even though it has a slightly greater heat of absorption and a slightly greater capacity. The primary difference in this case may be the rich $P_{CO_2}$. Because it is assumed to be a slower reacting hindered amine, KS-1 was assigned a value of 5 kPa compared to 7.5 kPa for MDEA/PZ.

Insight into Stripper Operation. McCabe-Thiele plots provide insight into stripping phenomena. FIG. 32 shows the McCabe-Thiele plot for 6.4 m K+/1.6 m PZ at 30 kPa comprising a flash section, 10 segments, and an equilibrium reboiler. Since this column is not pinched, it could benefit significantly by using more contacting. This is shown in FIG. 33, where the number of contacting segments is doubled. Flashing of the rich solution occurs at the top of the column. A rich end pinch is observed. The total equivalent work to generate $CO_2$ at 330 kPa increases from 23.7 kJ/gmol $CO_2$ with 10 segments to 23.2 kJ/gmol $CO_2$ (a 2% reduction) when the number of segments is doubled. Increasing the number of segments implies increased capital cost.

The McCabe-Thiele plot for 7 m MEA with the matrix (265/160 kPa) configuration is shown in FIG. 34. It is observed that the high- and low-pressure columns are highly pinched. A significant amount of $CO_2$ desorption occurs due to flashing and under boiling conditions in the reboiler. The rich, semirich, and lean loadings are 0.563, 0.513, and 0.447 mol $CO_2$/mol Alk. This implies that a significant amount of desorption occurs in both sections of the low-pressure column.

FIG. 35 shows the McCabe-Thiele plot for the internal exchange stripper with 7 m MEA at 160 kPa. The feed is subcooled with a loading of 0.563 mol $CO_2$/mol Alk. Some $CO_2$ absorption occurs at the stripper feed, increasing the loading to 0.583 mol $CO_2$/mol Alk in the first segment in the stripper before subsequent stripping. The stripper has a rich end pinch. A significant amount of stripping occurs in the reboiler, because it is assumed to be an equilibrium stage.

Concentrated, aqueous solutions of PZ have shown promise for improved solvent performance in absorption/stripping systems for $CO_2$ capture. For 8 m PZ, a $CO_2$ loading of approximately 0.25 mol $CO_2$/mol alkalinity is required to maintain a liquid solution without precipitation at room temperature (20° C.). Additionally, the solubility of PZ at 20° C. is approximately 14 wt % PZ, or 1.9 m PZ. The volatility of 8 m PZ systems was found to be between 10.2 and 18.7 ppm PZ at 40° C., which is comparable to 7 m MEA solutions.

Oxidative degradation of concentrated PZ has been shown to be four times slower than 7 m MEA in the presence of the combination of $Fe^{2+}$, $Cr^{3+}$, and $Ni^{2+}$ and $Fe^{2+}$ and $V^{4+}$. In the presence of copper-based corrosion inhibitors, oxidative degradation is an issue but can be drastically reduced with the use of Inhibitor "A". Concentrated PZ is resistant to thermal degradation up to 150° C. but does degrade at 175° C., losing 32% of the PZ over 2 weeks. The resistance of PZ to thermal degradation allows for the possibility of higher pressure strippers to improve energy performance.

Kinetic measurements have shown that the rate of $CO_2$ absorption into 8 m PZ is more than twice that of 7 m MEA at 40° C. and nearly double at 60° C. The working capacity of an 8 m PZ solution is 0.73 mol $CO_2$/(kg PZ+$H_2O$), nearly double that of 7 m MEA. Initial modeling of the stripper section indicate that the equivalent work required for stripping of an 8 m PZ solution will be approximately 5-10% lower than that of 7 m MEA.

The rapid rate of $CO_2$ absorption, low degradation rate, and low predicted equivalent work indicate that 8 m PZ solutions are an attractive option for $CO_2$ capture in absorption/stripping systems.

Effect on Power Plant Output and Process Improvement. The addition of an absorption/stripping system to a power plant will reduce the plant efficiency by reducing the net power produced from the plant, since steam is withdrawn from the plant to drive the reboiler and electrical power is used to operate compressors, blowers etc. Based on previous process analysis and economic studies, the net power output of a 500 MW power plant is about 150 kJ/gmol $CO_2$ with 90% $CO_2$ removal. Different separation techniques are compared by separation and compression work in FIG. 36. The smaller energy requirements for fans and pumps have not been included in this analysis.

The total equivalent work for reversible isothermal separation to 100 kPa and 313 K, and subsequent compression to 10 MPa, is 18.1 kJ/gmol $CO_2$. This is the theoretical minimum work for separation and compression to 10 MPa. This constitutes about 12% of the power plant output. If reversible, isothermal separation to 100 kPA and 313 K is combined with a real, five-stage, intercooled compressor with 75% adiabatic efficiency, the total equivalent work is 24.1 kJ/gmol $CO_2$ (16% of the power plant output). If an isothermal separation, such as a perfect membrane is used to produce $CO_2$ at the partial pressure in the flue gas at 313 K, and its pressure is increased by a real five-stage, intercooled compressor with 75% adiabatic efficiency, the total equivalent work is 28.4 kJ/gmol $CO_2$.

The best solvent and process configuration is the matrix (295/160 kPa) with MDEA/PZ. This consumes 26.2 kJ/gmol $CO_2$ (18% of the net output from a 500 MW power plant with 90% $CO_2$ capture). This best case offers 22% energy savings over the current industrial baseline (7 m MEA, $\Delta T=10$ K, 160 kPa), and 15% savings over the improved baseline (7 m MEA, $\Delta T=5$ K, 160 kPa). This best case requires 2.1 kJ/gmol $CO_2$ more work than the theoretical minimum with real compressors. Because this analysis is attempting to account for the use of heat and work, it is sensitive to the efficiency selected (75%) for the conversion of steam heat to work.

Multistage Flash Stripper Configuration.

The performance of the multistage flash was estimated for 8 m piperazine. The temperature and $CO_2$ loading of each stage was specified. The basis for the calculation was 0.5 moles/s piperazine (1 equivalent/s piperazine) in the liquid solvent being regenerated.

At each stage the equilibrium $CO_2$ partial pressure ($P^*_{CO2}$, Pa) was calculated as a function of temperature (T,K) and loading ($\alpha$, moles CO2/mole alkalinity) from an empirical correlation of the available data:

$$\text{Ln}(P^*_{CO2}) = 36.1 - 93200/8.314/T - 13.9\alpha + 8830\alpha/T + 14.3\alpha^2$$

The heat of $CO_2$ absorption ($\Delta H_{CO2}$, J/mole) was estimated by differentiating this expression to get:

$$\Delta H_{CO2} = -93200 + 8839 \cdot 8.314\alpha$$

The heat of $H_2O$ absorption (($\Delta H_{H2O}$, J/mole) was taken to be independent of temperature at −40 kJ/mole. The equilibrium partial pressure of water ($P^*_{H2O}$, atm) was at each stage was estimated by:

$$P^*_{H2O,j} = x_{H2O,j} \exp(\Delta H_{H2O}/8.314(1/373 - 1/T_j))$$

$$P_j = P^*_{H2O,j} + P^*_{CO2,j}$$

The work to compress the vapor product of each stage to 150 atm with precooling and intercooling to 40° C. was estimated by $$W_{comp}(\text{kJ/mole } CO_2) = 8.314/1000/0.5 \ln(150/P_j)$$

The liquid $CO_2$ flow rate of each stage ($l_{CO2,j}$, mole/s) is equal to the loading ($a_{CO2,j}$).

$$l_{CO2,j} = a_{CO2,j}$$

The gas $CO_2$ flow rate at each stage is the difference in CO2 between the feed to the stage ($l_{CO2,j-1}$) and the liquid leaving that stage:

$$g_{CO2,j} = l_{CO2,j-1} - l_{CO2,j}$$

The water flow rates are given by:

$$g_{H2O,j} = g_{CO2,j} P^*_{H2O,j}/P^*_{CO2,j}$$

$$l_{H2O,j} = l_{H2O,j-1} - g_{H2O,j}$$

The heat rate for each stage is given by the energy balance:

$$Q_j(\text{J/mole } CO_2) = (-g_{CO2,j}\Delta H_{CO2} - g_{H2O,j}\Delta H_{H2O} + (4.18 \cdot 18 l_{H2O} + 3.0 \cdot 0.5 \cdot 86)(T_j - T_{j-1}))/g_{CO2,j}$$

The energy value of this heat was represented by its equivalent work value:

$$W_{eq,j} = 0.7 Q_j (T_j + 10 - 313)/(T_j + 10)$$

The total work for each case is given by $$W_{total} = \Sigma(W_{comp,j} + W_{eq,j})(\alpha_j - \alpha_{j-1})/(\alpha_j - \alpha_{j-1})$$

Table 5 gives the estimated total work required to regenerate 8 m PZ at a rich loading of 0.39 moles/mole alkalinity to a lean loading of 0.30. The calculation assumes that lean solution from the last stage of the multistage flash is exchanged to give a rich solution with a feed T that is 5° C. less than the hot lean solution. The vapor produced from each stage is cooled to 40° C. to condense water, then compressed to 150 bar in a multistage compressor intercooled to 40° C.

TABLE 5

| Stages | $T_j$ (K) | $P_j$ (atm) | $\alpha_j$ (mole $CO_2$/mole alk) | $W_{total}$ (kJ/mole $CO_2$) |
|---|---|---|---|---|
| 3 | 423 | 15, 10, 7 | 0.36, 0.33, 0.30 | 30.1 |
| 2 | 423 | 13, 8 | 0.345, 0.3 | 31 |
| 3 | 423, 416, 406 | 15, 8, 4 | 0.36, 0.33, 0.30 | 32.9 |
| 3 | 373 | 1.7, 1.3, 1.1 | 0.36, 0.33, 0.30 | 39.6 |
| 2 | 373 | 1.5, 1.1 | 0.345, 0.3 | 41.2 |

$\alpha_{rich} = 0.39$,
$\alpha_{lean} = 0.30$,
$\Delta T_{approach} = 5°$ C., compression to 50 atm The least total work, 30.1 kJ.mole $CO_2$, is achieved by a three stage flash with each stage heated to 423 K by steam condensing at 433 K. The pressure of the three stages is respectively, 15, 10, and 7 atm. The $CO_2$ loading at each stage is respectively, 0.36, 0.33, and 0.30 moles/mole alkalinity. With a two stage flash at 423 K, the work increases to 31.0 kJ.mole $CO_2$.

With a simpler three stage flash that heats only at the first stage, the stage T is respectively, 423, 416, and 406. The latter stages operate at lower pressure to provide vapor without additional heating. The stage P is respectively, 15, 8, and 4 atm.

If the three stage flash is operated at 373 K, typical of conventional simple stripper designs, the total work is substantially greater, 41.2 kJ/mole. Furthermore the compressor must be sized to deal with a larger volume of gas at the respective stage pressure, 1.7, 1.3, 1.1 atm, resulting in greater capital cost as well.

Therefore, the present invention is well adapted to attain the ends and advantages mentioned as well as those that are inherent therein. While numerous changes may be made by those skilled in the art, such changes are encompassed within the spirit of this invention as illustrated, in part, by the appended claims.

REFERENCES

Leites I L, Sama D A, Lior N. The Theory and Practice of Energy Saving in the Chemical Industry Some Methods for Reducing Thermodynamic Irreversibility in Chemical Technology Processes. Energy. Oxford, UK; 2003; 28(1): 55-97.

Mitsubishi Heavy Industries. Flue Gas CO2 Recovery. Trade Publication.

Oyenekan B A, Rochelle G T. Energy performance of stripper configurations for CO2 capture by aqueous amines. Ind Eng Chem. Res. 2006; 45(8):2457-2464.

Jassim M S, Rochelle G T. Innovative absorber/stripper configurations for CO2 capture by aqueous monoethanolamine. Ind & Eng Chem. Res. 2006; 45(8):2465-2472.

Aroonwilas A, Veawab A. Cost Structure and Performance of CO2 Capture Unit Using Split-Stream Cycle. In 8th International Conference on Greenhouse Gas Control Technologies. Trondheim, Norway, 2006.

Cullinane J T. Thermodynamics and Kinetics of Aqueous piperazine with Potassium Carbonate for Carbon Dioxide Absorption. University of Texas, Austin; 2005. Ph.D. Dissertation.

Freguia S. Modeling of CO2 Removal from Flue Gas with Monoethanolamine. University of Texas, Austin. 2002. M. S. Thesis Jou F-Y, Mather A E, Otto F D. The Solubility of CO2 in a 30 Mass Percent Monoethanolamine Solution. Canadian J of Chem. Eng. 1995; 73(1):140-147.

Mimura T. Simayoshi H. Suda T. Lijima M, Mituoka S. Development of Energy Saving Technology for Flue Gas Carbon Dioxide Recovery in Power Plant by Chemical Absorption Method and Steam System. Energy Conversion and Management 1997, 38. (Suppl., Proceedings of the Third International Conference on Carbon Dioxide Removal. 1996). S57-S62.

Posey M L, Tapperson K G, Rochelle G T. A simple model for prediction of acid gas solubilities in alkanolamines. Gas Sep Purif 1996; 10(3):181-186.

Fisher K S, Beitler C, Rueter C, Rochelle G T, Jassim M S. Integrating MEA Regeneration with CO2 Compression and Peaking to Reduce CO2 Capture Costs. DOE Final Report for Trimeric Corp. subcontract of DOE contract #DE-FG02-04ER84111: 2005.

S. Bishnoi, Carbon Dioxide Absorption and Solution Equilibrium in piperazine Activated Methyldiethanolamine. The University of Texas at Austin, Austin, Tex., 2000.

M. D. Hilliard, A Predictive Thermodynamic Model for an Aqueous Blend of Potassium Carbonate, piperazine, and Monoethanolamine for Carbon Dioxide Capture from Flue Gas. The University of Texas at Austin, Austin, Tex., 2008.

J. T. Cullinane and G. T. Rochelle, "Thermodynamics of aqueous potassium carbonate, piperazine, and carbon dioxide." *Fluid Phase Equilibria.* 227(2) (2005) 197-213.

A. Sexton, "Catalysts and inhibitors for MEA oxidation." Presentation at GHGT-9, Washington D.C., 2008.

J. Davis, "Thermal degradation of monoethanolamine at stripper conditions." Presentation at GHGT-9, Washington D.C., 2008.

R. Dugas, "Absorption and desorption rates of carbon dioxide with monoethanolamine and piperazine." Presentation at GHGT-9, Washington D.C., 2008.

Brochure, Dow Chemical Company, *Ethyleneamines*; August, 2001 p 48.

Brochure, Diglycolamine® Agent—Product Information, *Diglycolamine® Agent—Product Information;* 2005 p 60.

F. Closmann, "MDEA/piperazine as a solvent for $CO_2$ capture." Presentation at GHGT-9, Washington D.C., 2008.

M. A. Al-Juaied, Carbon Dioxide Removal from Natural Gas by Membranes in the Presence of Heavy Hydrocarbons and by Aqueous Diglycolamine®/Morpholine. The University of Texas at Austin, Austin, Tex., 2002.

G. S. Goff and G. T. Rochelle, "Monoethanolamine degradation: $O_2$ mass transfer effects under $CO_2$ capture conditions." *Ind. Eng Chem. Res.* 43(20) (2004)6400-6408.

G. S. Goff and G. T. Rochelle, "Oxidation inhibitors for copper and iron catalyzed degradation of monoethanolamine in $CO_2$ capture processes." *Ind. Eng Chem. Res.* 45(8) (2006)2513-2521.

V. Ermatchkov, A. P. S. Kamps, D. Speyer, and G. Maurer, "Solubility of carbon dioxide in aqueous solutions of piperazine in the low gas loading region." *J. Chem. Eng. Data* 51(5) (2006)1788-1796.

What is claimed is:

1. An aqueous composition comprising:
    a diamine in an amount of from about 4 to about 20 moles/kg of water; and
    carbon dioxide in an amount of from about 0.3 to about 0.9 moles carbon dioxide per mole of the diamine.

2. The composition of claim 1 wherein the diamine is piperazine.

3. The composition of claim 1 wherein the diamine comprises one or more substituted piperazines chosen from methylpiperazine, dimethylpiperazine, ethylpiperazine, and diethylpiperazine.

4. The composition of claim 1 wherein the diamine is ethylenediamine.

5. The composition of claim 1 wherein the diamine comprises one or more substituted ethylenediamines chosen from methylpiperazine, dimethylpiperazine, ethylpiperazine, and diethylpiperazine.

6. A method for reducing the volatility of a diamine comprising:
    providing a solvent that comprises a diamine in an amount of from about 4 to about 20 moles/kg of water; and
    adding carbon dioxide to the solvent in an amount of from about 0.3 to about 0.9 moles per mole of diamine.

7. The method of claim 6 wherein the diamine is chosen from piperazine, a substituted piperazine, ethylenediamine, and a substituted ethylenediamine.

8. The method of claim 6 wherein carbamate ions form and reduce the volatility.

9. The method of claim 6 wherein the solvent is subjected to a temperature less than about 175° C.

10. A method for increasing the solubility of a solid diamine comprising providing a diamine to a solution of from about 0.3 to about 0.9 moles carbon dioxide per mole of the diamine.

11. The method of claim 10 wherein carbamate ions form.

12. The method of claim 10 wherein the diamine is chosen from piperazine, a substituted piperazine, ethylenediamine, and a substituted ethylenediamine.

13. A method comprising contacting a gas mixture comprising an acidic gas with a solvent, wherein the solvent comprises a diamine in an amount of from about 4 to about 20 moles/kg of water.

14. The method of claim 13 wherein the diamine is chosen from piperazine, a substituted piperazine, ethylenediamine, and a substituted ethylenediamine.

15. The method of claim 13 wherein the mixture comprises one or more gases chosen from a flue gas, a natural gas, a hydrogen gas, and a synthesis gas.

16. The method of claim 13 wherein the acidic gas is chosen from one or more of $CO_2$, $H_2S$, COS, $CS_2$, and mercaptans.

17. A method comprising:
    contacting a gas mixture comprising an acidic gas with a solvent, wherein the solvent comprises a diamine in an amount of from about 4 to about 20 moles/kg of water; and
    allowing the acidic gas to transfer from the gas mixture to the solvent.

18. The method of claim 17 further comprising forming a purified gaseous stream and a rich solvent stream.

19. The method of claim 17 wherein the diamine is chosen from piperazine, a substituted piperazine, ethylenediamine, and a substituted ethylenediamine.

20. The method of claim 17 further comprising routing the rich solvent stream through a stripper.

21. The method of claim 17 wherein the stripper is chosen from one or more of a simple stripper, matrix stripper, a multistage flash stripper, an exchange stripper, a multipressure stripper, and a flashing feed stripper.

22. The method of claim 17 wherein the gas mixture comprises one or more gases chosen from a flue gas, a natural gas, a hydrogen gas, and a synthesis gas.

23. The method of claim 17 wherein the acidic gas is chosen from one or more of $CO_2$, $H_2S$, COS, $CS_2$, and mercaptans.

24. The method of claim 17 further comprising recycling a solvent stream exiting the stripper.

25. The method of claim 17 wherein the stripper is operated at a temperature less than about 175° C.

26. The method of claim 17 wherein the stripper is operated at a temperature between about 120° C. and about 160° C.

27. A method comprising:
   contacting a gas mixture comprising an acidic gas with a solvent in an absorber, wherein the solvent comprises piperazine or a substituted piperazine in an amount of from about 4 to about 20 moles/kg of water;
   allowing the acidic gas to transfer from the gas mixture to the solvent;
   forming a purified gaseous stream and a rich solvent stream; and
   routing the rich solvent stream through a multistage flash stripper, wherein the multistage flash stripper is operated at temperatures less than about 175° C.

* * * * *

UNITED STATES PATENT AND TRADEMARK OFFICE
CERTIFICATE OF CORRECTION

PATENT NO. : 7,938,887 B2  
APPLICATION NO. : 12/349627  
DATED : May 10, 2011  
INVENTOR(S) : Rochelle et al.

Page 1 of 1

It is certified that error appears in the above-identified patent and that said Letters Patent is hereby corrected as shown below:

Column 20, line 59, Claim 20
After "The method of claim", insert --18-- and delete "17".

Column 20, line 61, Claim 21
After "The method of claim", insert --20-- and delete "17".

Column 21, line 4, Claim 24
After "The method of claim", insert --20-- and delete "17".

Column 21, line 6, Claim 25
After "The method of claim", insert --20-- and delete "17".

Column 21, line 8, Claim 26
After "The method of claim", insert --20-- and delete "17".

Signed and Sealed this
Fourteenth Day of February, 2012

David J. Kappos
*Director of the United States Patent and Trademark Office*